United States Patent [19]

Skeen et al.

[11] Patent Number: 5,187,787
[45] Date of Patent: Feb. 16, 1993

[54] APPARATUS AND METHOD FOR PROVIDING DECOUPLING OF DATA EXCHANGE DETAILS FOR PROVIDING HIGH PERFORMANCE COMMUNICATION BETWEEN SOFTWARE PROCESSES

[75] Inventors: Marion D. Skeen, San Francisco; Mark Bowles, Woodside, both of Calif.

[73] Assignee: Teknekron Software Systems, Inc., Palo Alto, Calif.

[21] Appl. No.: 386,584

[22] Filed: Jul. 27, 1989

[51] Int. Cl.$^5$ ............................................. G06F 15/16
[52] U.S. Cl. ..................... 395/600; 364/DIG. 1; 364/281.3; 364/240.8; 364/246.3
[58] Field of Search ............... 364/DIG. 1, DIG. 2; 395/600

[56] References Cited

U.S. PATENT DOCUMENTS

| | | | |
|---|---|---|---|
| 4,363,093 | 12/1982 | Davis et al. | 364/DIG. 1 |
| 4,688,170 | 8/1987 | Waite et al. | 364/DIG. 1 |
| 4,718,005 | 1/1988 | Feigenbaum et al. | 364/DIG. 1 |
| 4,815,030 | 3/1989 | Cross et al. | 364/900 |
| 4,851,988 | 7/1989 | Trottier et al. | 364/200 |
| 4,914,583 | 4/1990 | Weisshaar et al. | 364/DIG. 1 |
| 4,937,784 | 6/1990 | Masai et al. | 364/DIG. 2 |
| 4,975,830 | 12/1990 | Gerpheide et al. | 364/200 |
| 4,992,972 | 2/1991 | Brooks et al. | 364/900 |
| 4,999,771 | 3/1991 | Ralph et al. | 364/200 |
| 5,062,037 | 10/1991 | Shorter et al. | 364/DIG. 1 |
| 5,073,852 | 12/1991 | Siegel et al. | 395/700 |
| 5,101,406 | 3/1992 | Messenger | 370/94.1 |

OTHER PUBLICATIONS

TIB Reference Manual, "The Teknekron Information Bus TM: Programmer's Reference Manual," Version 1.1, Sep. 7, 1989, pp. 1–46.
"BASIS Application Programming Interface (AIP)," pp. 1–82.
"BASIS Objectives, Environments, Concepts Functions, Value for Business Partners and Customers," IBM Confidential.
DataTrade R1, "Lans Lans/Wans," Aug. 23, 1990, pp. 1–4.
DataTrade R1, "Lans DT R1 Software Components," Aug. 23, 1990, pp. 1–7.
DataTrade R1, "Lans DT R1 Networkf Architecture," Aug. 23, 1990, pp. 1–14.
DataTrade R1, "Lans Broadcast Concepts," Aug. 23, 1990, pp. 1–9.
DataTrade R1, "Lans Broadcast Performance," Aug. 23, 1990, pp. 1–3.
DataTrade R1, "Lans Point-Point Concepts," Aug. 23, 1990, pp. 1–4.
DataTrade R1, "Lans Security," Aug. 23, 1990, pp. 1–4.
DataTrade R1, "API Overview," Jun. 6, 1990, pp. 1–11.
DataTrade R1, "API Datatrade API Verbs," Jun. 6, 1990, pp. 1–14.

(List continued on next page.)

*Primary Examiner*—Thomas M. Heckler
*Attorney, Agent, or Firm*—Ronald Craig Fish

[57] ABSTRACT

A communication interface for decoupling one software application from another software application such communications between applications are facilitated and applications may be developed in modularized fashion. The communication interface is comprised of two libraries of programs. One libray manages self-describing forms which contain actual data to be exchanged as well as type information regarding data format and class definition that contain semantic information. Another library manages communications and includes a subject mapper to receive subscription requests regarding a particular subject and map them to particular communication disciplines and to particular services supplying this information. A number of communication disciplines also cooperate with the subject mapper or directly with client applications to manage communications with various other applications using the communication protocols used by those other applications.

68 Claims, 9 Drawing Sheets

OTHER PUBLICATIONS

DataTrade R1, "DataTrade Using DataTrade: APs," Aug. 23, 1990, pp. 1-14.

"Delivering Integrated Solutions," 6 pages.

Digital, "PAMS Message Bus for VAX/VMS," May 11, 1990, pp. 1-3.

Howard Kilman and Glen Macko, "An Architectural Perspective of a Common Distributed Heterogeneous Message Bus," 1987, pp. 171-184.

Glen Macko, "Developing a Message Bus for Integrating VMS High Speed Task to Task Communications," Fall 1986, pp. 339-347.

Steven G. Judd, "A Practical Approach to Developing Client-Server Applications Among VAX/VMS, CICS/VS, and IMS/VS LU6.2 Applications Made Easy," Spring 1990, pp. 95-112.

Product Insight, "Don't Miss the Lates Message Bus, VAXPAMSV2.5," Jun. 1989, pp. 18-21.

Digital Equipment Corporation, "Digital Packaged Application Software Description PASD PASD Name: VAX-PAMS PASD: US.002.002," Version 2.5, Dec. 5, 1989, pp. 1-8.

Digital Equipment Corporation, "PAMS Basic Call Set PAMS Message BUS Efficient Task-to-Task Communication," Jul. 1989, pp. 1-25.

Digital Equipment Corporation, "Package Application Software Description for ULTRIX-PAMS," Version 1.2, Dec. 5, 1989, pp. 1-7.

Digital Equipment Corporation, "Package Application Software Description for PC-PAMS," Version 1.2, Dec. 5, 1989, pp. 1-7.

Digital Equipment Corporation, "PAMS Self-Maintenance Service Description," Apr. 3, 1990, pp. 1-3.

Digital Equipment Corporation, "LU6.2 PAMS Self-Maintenance Service Description," Apr. 3, 1990, pp. 1-3.

Digital Equipment Corporation, "PAMS Installation and Orientation Service Description," Jan. 31, 1989, pp. 1-3.

Digital Equipment Corporation, "PAMS LU6.2 Installation and Orientation Service Description," Apr. 19, 1990, pp. 1-3.

Digital Equipment Corporation, "Package Application Software Description for PAMS LU6.2," Version 2.1, Apr. 19, 1990, pp. 1-18.

The Metamorphosis of Information Management; David Gelernter; Scientific American, Aug. 1989; pp. 66-73.

EXAMPLE FORM CLASS DEFINITIONS

PLAYER _ NAME: CLASS 1000
    RATING: FLOATING _ POINT CLASS II
    AGE: INTEGER CLASS 12
    LAST _ NAME: STRING _ 20 _ ASCII CLASS 10
    FIRST_ NAME: STRING _ 20 _ ASCII CLASS 10

FIGURE 2

PLAYER _ ADDRESS: CLASS 1001
    STREET: STRING _ 20 _ ASCII CLASS 10
    CITY:   STRING _ 20 _ ASCII CLASS 10
    STATE:  STRING _ 20 _ ASCII CLASS 10

FIGURE 3

TOURNAMENT _ ENTRY: CLASS 1002
TOURNAMENT _ NAME: STRING _ 20 _ ASCII CLASS 10
PLAYER: PLAYER _ NAME CLASS 1000
ADDRESS: PLAYER _ ADDRESS CLASS 1001

FIGURE 4

STRING _ 20 _ ASCII: CLASS 10
    STRING _ 20 ASCII
INTEGER: CLASS 12
    INTEGER _ 3
FLOATING - POINT : CLASS 11
    FLOATING _ POINT _ 1/1

FIGURE 5

INSTANCE OF FORM OF CLASS TOURNAMENT _ ENTRY
CLASS 1002 AS STORED IN MEMORY

FORMAT OPERATION

DEC TO ETHERNET™

| FROM | TO |
|---|---|
| 11 | 15 |
| 12 | 22 |
| 10 | 25 |
| . | |
| . | |
| . | |

FIGURE 9

ETHERNET™ TO IBM

| FROM | TO |
|---|---|
| 15 | 31 |
| 22 | 33 |
| 25 | 42 |
| . | . |
| . | . |
| . | . |

FIGURE 10

GENERAL CONVERSION PRODECURES TABLE

| FROM | TO | CONVERSION PROGRAM |
|---|---|---|
| 11 | 15 | FLOAT I _ ETHER |
| 12 | 22 | INTEGER I _ ETHER |
| 10 | 25 | ASCII _ ETHER |
| 15 | 31 | ETHER _ FLOAT 2 |
| 33 | 22 | ETHER _ INTEGER |
| 42 | 25 | ETHER _ EBCDIC |
| . | . | . |
| . | . | . |
| . | . | . |

FIGURE 11

PERSON_CLASS: CLASS 1021

LAST: STRING_20 ASCII

FIRST: STRING_20 ASCII

CLASS DEFINITION

CLASS DESCRIPTOR STORED
IN RAM AS A FORM

APPARATUS AND METHOD FOR PROVIDING DECOUPLING OF DATA EXCHANGE DETAILS FOR PROVIDING HIGH PERFORMANCE COMMUNICATION BETWEEN SOFTWARE PROCESSES

BACKGROUND OF THE INVENTION

The invention pertains to the field of decoupled information exchange between software processes running on different or even the same computer where the software processes may use different formats for data representation and organization or may use the same formats and organization but said formats and organization may later be changed without requiring any reprogramming. Also, the software processes use "semantic" or field-name information in such a way that each process can understand and use data it has received from any foreign software process, regardless of semantic or field name differences. The semantic information is decoupled from data representation and organization information.

With the proliferation of different types of computers and software programs and the ever-present need for different types of computers running different types of software programs to exchange data, there has arisen a need for a system by which such exchanges of data can occur. Typically, data that must be exchanged between software modules that are foreign to each other comprises text, data and graphics. However, there occasionally arises the need to exchange digitized voice or digitized image data or other more exotic forms of information. These different types of data are called "primitives." A software program can manipulate only the primitives that it is programmed to understand and manipulate. Other types of primitives, when introduced as data into a software program, will cause errors.

"Foreign," as the term is used herein, means that the software modules or host computers involved in the exchange "speak different languages." For example, the Motorola and Intel microprocessor widely used in personal computers and work stations use different data representations in that in one family of microprocessors the most significant byte of multibyte words is placed first while in the other family of processors the most significant byte is placed last. Further, in IBM computers text letters are coded in EBCDIC code while in almost all other computers text letters are coded in ASCII code. Also, there are several different ways of representing numbers including integer, floating point, etc. Further, foreign software modules use different ways of organizing data and use different semantic information, i.e., what each field in a data record is named and what it means.

The use of these various formats for data representation and organization means that translations either to a common language or from the language of one computer or process to the language of another computer or process must be made before meaningful communication can take place. Further, many software modules between which communication is to take place reside on different computers that are physically distant from each other and connected only local area networks, wide area networks, gateways, satellites, etc. These various networks have their own widely diverse protocols for communication. Also, at least in the world of financial services, the various sources of raw data such as Dow Jones News or Telerate ™ use different data formats and communication protocols which must be understood and followed to receive data from these sources.

In complex data situations such as financial data regarding equities, bonds, money markets, etc., it is often useful to have nesting of data. That is, data regarding a particular subject is often organized as a data record having multiple "fields," each field pertaining to a different aspect of the subject. It is often useful to allow a particular field to have subfields and a particular subfield to have its own subfields and so on for as many levels as necessary. For purposes of discussion herein, this type of data organization is called "nesting." The names of the fields and what they mean relative to the subject will be called the "semantic information" for purposes of discussion herein. The actual data representation for a particular field, i.e., floating point, integer, alphanumeric, etc., and the organization of the data record in terms of how many fields it has, which are primitive fields which contain only data, and which are nested fields which contain subfields, is called the "format" or "type" information for purposes of discussion herein. A field which contains only data (and has no nested subfields) will be called a "primitive field," and a field which contains other fields will be called a "constructed field" herein.

There are two basic types of operations that can occur in exchanges of data between software modules. The first type of operation is called a "format operation" and involves conversion of the format of one data record (hereafter data records may sometimes be called "a forms") to another format. An example of such a format operation might be conversion of data records with floating point and EBCDIC fields to data records having the packed representation needed for transmission over an ETHERNET ™ local area network. At the receiving process end another format operation for conversion from the ETHERNET ™ packet format to integer and ASCII fields at the receiving process or software module might occur. Another type of operation will be called herein a "semantic-dependent operation" because it requires access to the semantic information as well as to the type or format information about a form to do some work on the form such as to supply a particular field of that form, e.g., today's IBM stock price or yesterday's IBM low price, to some software module that is requesting same.

Still further, in today's environment, there are often multiple sources of different types of data and/or multiple sources of the same type of data where the sources overlap in coverage but use different formats and different communication protocols (or even overlap with the same format and the same communication protocol) It is useful for a software module (software modules may hereafter be sometimes referred to as "applications") to be able to obtain information regarding a particular subject without knowing the network address of the service that provides information of that type and without knowing the details of the particular communication protocol needed to communicate with that information source.

A need has arisen therefore for a communication system which can provide an interface between diverse software modules, processes and computers for reliable, meaningful exchanges of data while "decoupling" these software modules and computers. "Decoupling" means that the software module programmer can access information from other computers or software processes without knowing where the other software modules and computers are in a network, the format that forms and data take on the foreign software, what communication protocols are necessary to communicate with the foreign software modules or computers, or what communication protocols are used to transit any networks between the source process and the destination process; and without knowing which of a multiplicity of sources of raw data can supply the requested data. Further, "decoupling," as the term is used herein, means that data can be requested at one time and supplied at another and that one process may obtain desired data from the instances of forms created with foreign format and foreign semantic data through the exercise by a communication interface of appropriate semantic operations to extract the requested data from the foreign forms with the extraction process being transparent to the requesting process.

Various systems exist in the prior art to allow information exchange between foreign software modules with various degrees of decoupling. One such type of system is any electronic mail software which implements Electronic Document Exchange Standards including CCITT's X.409 standard. Electronic mail software decouples applications in the sense that format or type data is included within each instance of a data record or form. However, there are no provisions for recording or processing of semantic information. Semantic operations such as extraction or translation of data based upon the name or meaning of the desired field in the foreign data structure is therefore impossible. Semantic-Dependent Operations are very important if successful communication is to occur. Further, there is no provision in Electronic Mail Software by which subject-based addressing can be implemented wherein the requesting application simply asks for information by subject without knowing the address of the source of information of that type. Further, such software cannot access a service or network for which a communication protocol has not already been established.

Relational Database Software and Data Dictionaries are another example of software systems in the prior art for allowing foreign processes to share data. The shortcoming of this class of software is that such programs can handle only "flat" tables, records and fields within records but not nested records within records Further, the above-noted shortcoming in Electronic Mail Software also exists in Relational Database Software.

SUMMARY OF THE INVENTION

According to the teachings of the invention, there is provided a method and apparatus for providing a structure to interface foreign processes and computers while providing a degree of decoupling heretofore unknown.

The data communication interface software system according to the teachings of the invention consists essentially of several libraries of programs organized into two major components, a communication component and a data-exchange component. Interface, as the term is used herein in the context of the invention, means a collection of functions which may be invoked by the application to do useful work in communicating with a foreign process or a foreign computer or both. Invoking functions of the interface may be by subroutine calls from the application or from another component in the communications interface according to the invention.

In the preferred embodiment, the functions of the interface are carried out by the various subroutines in the libraries of subroutines which together comprise the interface. Of course, those skilled in the art will appreciate that separate programs or modules may be used instead of subroutines and may actually be preferable in some cases.

Data format decoupling is provided such that a first process using data records or forms having a first format can communicate with a second process which has data records having a second, different format without the need for the first process to know or be able to deal with the format used by the second process. This form of decoupling is implemented via the data-exchange component of the communication interface software system.

The data-exchange component of the communication interface according to the teachings of the invention includes a forms-manager module and a forms-class manager module. The forms-manager module handles the creation, storage, recall and destruction of instances of forms and calls to the various functions of the forms-class manager. The latter handles the creation, storage, recall, interpretation, and destruction of forms-class descriptors which are data records which record the format and semantic information that pertain to particular classes of forms. The forms-class manager can also receive requests from the application or another component of the communication interface to get a particular field of an instance of a form when identified by the name or meaning of the field, retrieve the appropriate form instance, and extract and deliver the requested data in the appropriate field. The forms-class manager can also locate the class definition of an unknown class of forms by looking in a known repository of such class definitions or by requesting the class definition from the forms-class manager linked to the foreign process which created the new class of form. Semantic data, such as field names, is decoupled from data representation and organization in the sense that semantic information contains no information regarding data representation or organization. The communication interface of the invention implements data decoupling in the semantic sense and in the data format sense. In the semantic sense, decoupling is implemented by virtue of the ability to carry out semantic-dependent operations. These operations allow any process coupled to the communications interface to exchange data with any other process which has data organized either the same or in a different manner by using the same field names for data which means the same thing in the preferred embodiment. In an alternative embodiment semantic-dependent operations implement an aliasing or synonym conversion facility whereby incoming data fields having different names but which mean a certain thing are either relabeled with field names understood by the requesting process or are used as if they had been so relabeled.

Data distribution decoupling is provided such that a requesting process can request data regarding a particular subject without knowing the network address of the server or process where the data may be found. This form of decoupling is provided by a subject-based addressing system within the communication interface.

Subject-based addressing is implemented by the communication component of the communication interface of the invention. The communication component receives "subscribe" requests from an application which specifies the subject upon which data is requested. A subject-mapper module in the communication component receives the request from the application and then looks up the subject in a database, table or the like. The database stores "service records" which indicate the various server processes that supply data on various subjects. The appropriate service record identifying the particular server process that can supply data of the requested type and the communication protocol (hereafter sometimes called the service discipline) to use in communicating with the identified server process is returned to the subject-mapper module.

The subject mapper has access to a plurality of communications programs called "service disciplines." Each service discipline implements a predefined communication protocol which is specific to a server process, network, etc. The subject mapper then invokes the appropriate service discipline identified in the service record.

The service discipline is given the subject by the subject mapper and proceeds to establish communications with the appropriate server process. Thereafter, instances of forms containing data regarding the subject are sent by the server process to the requesting process via the service discipline which established the communication.

Service protocol decoupling is provided by the process described in the preceding paragraph.

Temporal decoupling is implemented in some service disciplines directed to page-oriented server processes such as Telerate ™ by access to real-time data bases which store updates to pages to which subscriptions are outstanding.

BRIEF DESCRIPTION OF THE DRAWINGS

FIG. 2 is an example of a form-class definition of the contructed variety.

FIG. 3 is an example of another constructed form-class definition.

FIG. 4 is an example of a constructed form-class definition containing fields that are themselves constructed forms. Hence, this is an example of nesting.

FIG. 5 is an example of three primitive form classes.

FIG. 9 is a target format-specific table for use in format operations.

FIG. 10 is another target format-specific table for use in format operations.

FIG. 11 is an example of a general conversion table for use in format operations.

DETAILED DESCRIPTION OF THE PREFERRED AND ALTERNATIVE EMBODIMENTS

Figure 1:
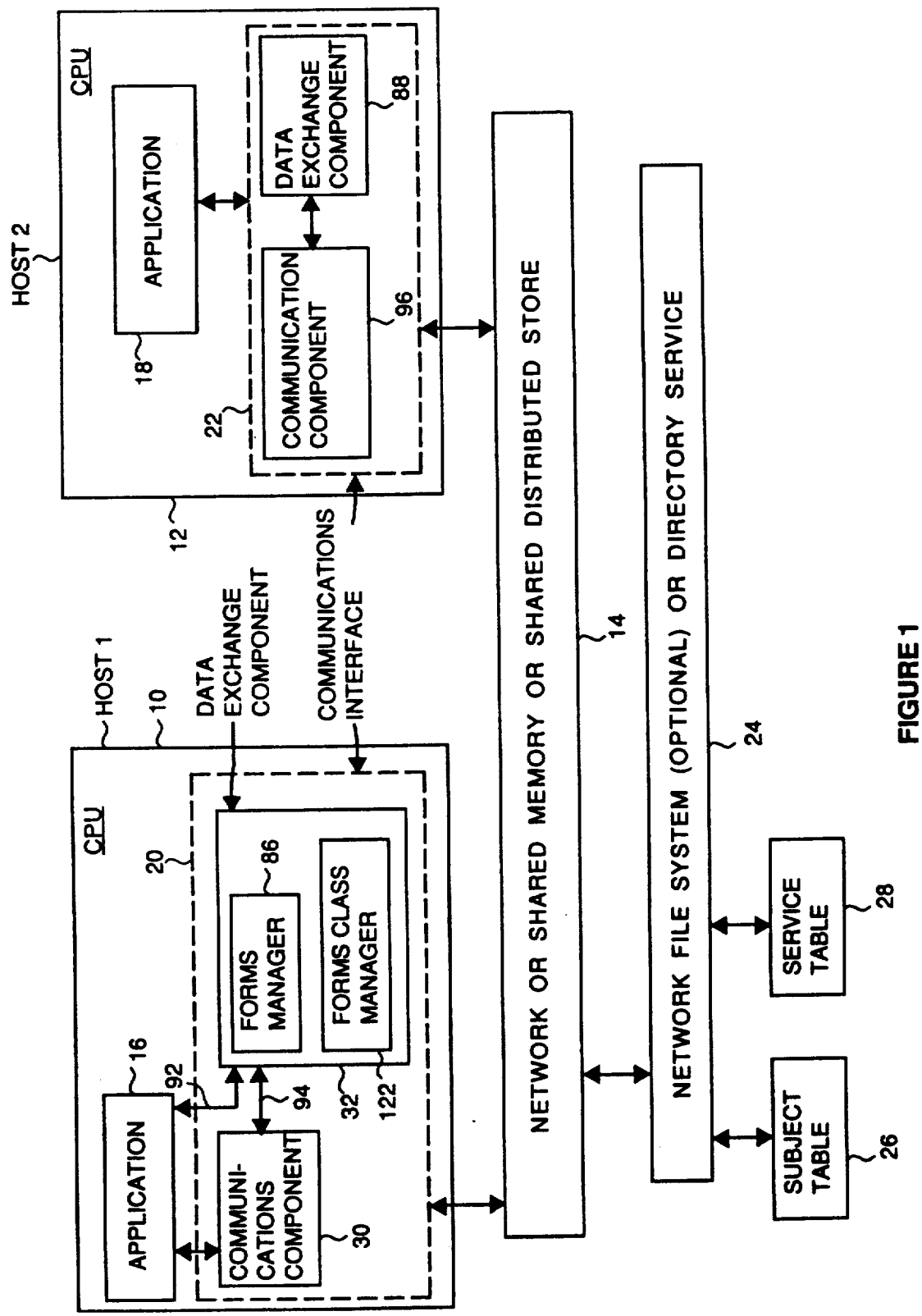
FIG. 1 is a block diagram illustrating the relationships of the various software modules of the communication interface of one embodiment of the invention to client applications and the network.

Referring to FIG. 1 there is shown a block diagram of a typical system in which the communications interface of the invention could be incorporated, although a wide variety of system architectures can benefit from the teachings of the invention. The communication interface of the invention may be sometimes hereafter referred to as the TIB or Teknekron Information Bus in the specification of an alternative embodiment given below. The reader is urged at this point to study the glossary of terms included in this specification to obtain a basic understanding of some of the more important terms used herein to describe the invention. The teachings of the invention are incorporated in several libraries of computer programs which, taken together, provide a communication interface having many functional capabilities which facilitate modularity in client application development and changes in network communication or service communication protocols by coupling of various client applications together in a "decoupled" fashion. Hereafter, the teachings of the invention will be referred to as the communication interface. "Decoupling," as the term is used herein, means that the programmer of client application is freed of the necessity to know the details of the communication protocols, data representation format and data record organization of all the other applications or services with which data exchanges are desired. Further, the programmer of the client application need not know the location of services or servers providing data on particular subjects in order to be able to obtain data on these subjects. The communication interface automatically takes care of all the details in data exchanges between client applications and between data-consumer applications and data-provider services.

The system shown in FIG. 1 is a typical network coupling multiple host computers via a network or by shared memory. Two host computers, 10 and 12, are shown in FIG. 1 running two client applications 16 and 18, although in other embodiments these two client applications may be running on the same computer. These host computers are coupled by a network 14 which may be any of the known networks such as the ETHERNET ™ communication protocol, the token-ring protocol, etc. A network for exchanging data is not required to practice the invention, as any method of exchanging data known in the prior art will suffice for purposes of practicing the invention. Accordingly, shared memory files or shared distributed storage to which the host computers 10 and 12 have equal access will also suffice as the environment in which the teachings of the invention are applicable.

Each of the host computers 10 and 12 has random access memory and bulk memory such as disk or tape drives associated therewith (not shown). Stored in these memories are the various operating system programs, client application programs, and other programs such as the programs in the libraries that together comprise the communication interface which cause the host computers to perform useful work. The libraries of programs in the communication interface provide basic tools which may be called upon by client applications to do such things as find the location of services that provide data on a particular subject and establish communications with that service using the appropriate communication protocol.

Each of the host computers may also be coupled to user interface devices such as terminals, printers, etc. (not shown).

In the exemplary system shown in FIG. 1, host computer 10 has stored in its memory a client application program 16. Assume that this client application program 16 requires exchanges of data with another client application program or service 18 controlling host computer 12 in order to do useful work. Assume also that the host computers 10 and 12 use different formats for representation of data and that application programs 16 and 18 also use different formats for data representation and organization for the data records created thereby. These data records will usually be referred to herein as forms. Assume also that the data path 14 between the host computers 10 and 12 is comprised of a local area network of the ETHERNET TM variety.

Each of the host processors 10 and 12 is also programmed with a library of programs, which together comprise the communication interfaces 20 and 22, respectively. The communication interface programs are either linked to the compiled code of the client applications by a linker to generate run time code, or the source code of the communication programs is included with the source code of the client application programs prior to compiling. In any event, the communication library programs are somehow bound to the client application. Thus, if host computer 10 was running two client applications, each client application would be bound to a communication interface module such as module 20.

The purpose of the communications interface module 20 is to decouple application 16 from the details of the data format and organization of data in forms used by application 18, the network address of application 18, and the details of the communication protocol used by application 18, as well as the details of the data format and organization and communication protocol necessary to send data across network 14. Communication interface module 22 serves the same function for application 18, thereby freeing it from the need to know many details about the application 16 and the network 14. The communication interface modules facilitate modularity in that changes can be made in client applications, data formats or organizations, host computers, or the networks used to couple all of the above together without the need for these changes to ripple throughout the system to ensure continued compatibility.

In order to implement some of these functions, the communications interfaces 20 and 22 have access via the network 14 to a network file system 24 which includes a subject table 26 and a service table 28. These tables will be discussed in more detail below with reference to the discussion of subject-based addressing. These tables list the network addresses of services that provide information on various subjects.

A typical system model in which the communication interface is used consists of users, users groups, networks, services, service instances (or servers) and subjects. Users, representing human end users, are identified by a user-ID. The user ID used in the communications interface is normally the same as the user ID or log-on ID used by the underlying operating system (not shown). However, this need not be the case. Each user is a member of exactly one group.

Groups are comprised of users with similar service access patterns and access rights. Access rights to a service or system object are grantable at the level of users and at the level of groups. The system administrator is responsible for assigning users to groups.

A "network," as the term is used herein, means the underlying "transport layer" (as the term is used in the ISO network layer model) and all layers beneath the transport layer in the ISO network model. An application can send or receive data across any of the networks to which its host computer is attached.

The communication interface according to the teachings of the invention, of which blocks 20 and 22 in FIG. 1 are exemplary, includes for each client application to which it is bound a communications component 30 and a data-exchange component 32. The communications component 30 is a common set of communication facilities which implement, for example, subject-based addressing and/or service discipline decoupling. The communications component is linked to each client application. In addition, each communications component is linked to the standard transport layer protocols, e.g., TCP/IP, of the network to which it is coupled. Each communication component is linked to and can support multiple transport layer protocols. The transport layer of a network does the following things: it maps transport layer addresses to network addresses, multiplexes transport layer connections onto network connections to provide greater throughput, does error detection and monitoring of service quality, error recovery, segmentation and blocking, flow control of individual connections of transport layer to network and session layers, and expedited data transfer. The communications component provides reliable communications protocols for client applications as well as providing location transparency and network independence to the client applications.

The data-exchange component of the communications interface, of which component 32 is typical, implements a powerful way of representing and transmitting data by encapsulating the data within self-describing data objects called forms. These forms are self-describing in that they include not only the data of interest, but also type or format information which describes the representations used for the data and the organization of the form. Because the forms include this type or format information, format operations to convert a particular form having one format to another format can be done using strictly the data in the form itself without the need for access to other data called class descriptors or class definitions which give semantic information. The meaning of semantic information in class descriptors basically means the names of the fields of the form.

The ability to perform format operations solely with the data in the form itself is very important in that it prevents the delays encountered when access must be made to other data objects located elsewhere, such as class descriptors. Since format operations alone typically account for 25 to 50% of the processing time for client applications, the use of self-describing objects streamlines processing by rendering it faster.

The self-describing forms managed by the data-exchange component also allow the implementation of generic tools for data manipulation and display. Such tools include communication tools for sending forms between processes in a machine-independent format. Further, since self-describing forms can be extended, i.e., their organization changed or expanded, without adversely impacting the client applications using said forms, such forms greatly facilitate modular application development.

Since the lowest layer of the communications interface is linked with the transport layer of the ISO model and since the communications component 30 includes multiple service disciplines and multiple transport-layer protocols to support multiple networks, it is possible to write application-oriented protocols which transparently switch over from one network to another in the event of a network failure.

A "service" represents a meaningful set of functions which are exported by an application for use by its client applications. Examples of services are historical news retrieval services such as Dow Jones New, Quotron data feed, and a trade ticket router. Applications typically export only one service, although the export of many different services is also possible.

A "service instance" is an application or process capable of providing the given service. For a given service, several "instances" may be concurrently providing the service so as to improve the throughput of the service or provide fault tolerance.

Although networks, services and servers are traditional components known in the prior art, prior art distributed systems do not recognize the notion of a subject space or data independence by self-describing, nested data objects. Subject space supports one form of decoupling called subject-based addressing. Self-describing data objects which may be nested at multiple levels are new. Decoupling of client applications from the various communications protocols and data formats prevalent in other parts of the network is also very useful.

The subject space used to implement subject-based addressing consists of a hierarchical set of subject categories. In the preferred embodiment, a four-level subject space hierarchy is used. An example of a typical subject is: "equity.ibm.composite.trade." The client applications coupled to the communications interface have the freedom and responsibility to establish conventions regarding use and interpretations of various subject categories.

Each subject is typically associated with one or more services providing data about that subject in data records stored in the system files. Since each service will have associated with it in the communication components of the communication interface a service discipline, i.e., the communication protocol or procedure necessary to communicate with that service, the client applications may request data regarding a particular subject without knowing where the service instances that supply data on that subject are located on the network by making subscription requests giving only the subject without the network address of the service providing information on that subject. These subscription requests are translated by the communications interface into an actual communication connection with one or more service instances which provide information on that subject.

A set of subject categories is referred to as a subject domain. Multiple subject domains are allowed. Each domain can define domain-specific subject and coding functions for efficiently representing subjects in message headers.

DATA INDEPENDENCE: The Data-Exchange Component

The overall purpose of the data-exchange component such as component 32 in FIG. 1 of the communication interface is to decouple the client applications such as application 16 from the details of data representation, data structuring and data semantics.

Referring to FIG. 2, there is shown an example of a class definition for a constructed class which defines both format and semantic information which is common to all instances of forms of this class. In the particular example chosen, the form class is named Player_Name and has a class ID of 1000. The instances of forms of this class 1000 include data regarding the names, ages and NTRP ratings for tennis players Every class definition has associated with it a class number called the class ID which uniquely identifies the class.

The class definition gives a list of fields by name and the data representation of the contents of the field. Each field contains a form and each form may be either primitive or constructed. Primitive class forms store actual data, while constructed class forms have fields which contain other forms which may be either primitive or constructed. In the class definition of FIG. 2, there are four fields named Rating, Age, Last_Name and First_Name. Each field contains a primitive class form so each field in instances of forms of this class will contain actual data. For example, the field Rating will always contain a primitive form of class 11. Class 11 is a primitive class named Floating_Point which specifies a floating-point data representation for the contents of this field. The primitive class definition for the class Floating_Point, class 11, is found in FIG. 5. The class definition of the primitive class 11 contains the class name, Floating_Point, which uniquely identifies the class (the class number, class 11 in this example, also uniquely identifies the class) and a specification of the data representation of the single data value. The specification of the single data value uses well-known predefined system data types which are understood by both the host computer and the application dealing with this class of forms.

Typical specifications for data representation of actual data values include integer, floating point, ASCII character strings or EBCDIC character strings, etc. In the case of primitive class 1/1, the specification of the data value is Floating_Point_11 which is an arbitrary notation indicating that the data stored in instances of forms of this primitive class will be floating-point data the decimal point.

Returning to the consideration of the Player_Name class definition of FIG. 2, the second field is named Age. This field contains forms of the primitive class named Integer associated with class number 12 and defined in FIG. 5. The Integer class of form, class 12, has, per the class definition of FIG. 5, a data representation specification of Integer_3, meaning the field contains integer data having three digits. The last two fields of the class 1000 definition in FIG. 2 are Last_Name and First_Name. Both of these fields contain primitive forms of a class named String—Twenty—ASCII, class 10. The class 10 class definition is given in FIG. 5 and specifies that instances of forms of this class contain ASCII character strings which are 20 characters long.

FIG. 3 gives another constructed class definition named Player—Address, class 1001. Instances of forms of this class each contain three fields named Street, City and State. Each of these three fields contains primitive forms of the class named String—20—ASCII, class 10. Again, the class definition for class 10 is given in FIG. 5 and specifies a data representation of 20-character ASCII strings.

An example of the nesting of constructed class forms is given in FIG. 4. FIG. 4 is a class definition for instances of forms in the class named Tournament—Entry, class 1002. Each instance of a form in this class contains three fields named Tournament—Name, Player, and Address. The field Tournament—Name includes forms of the primitive class named String—Twenty—ASCII, class 10 defined in FIG. 5. The field named Player contains instances of constructed forms of the class named Player—Name, class 1000 having the format and semantic characteristics given in FIG. 2. The field named Address contains instances of the constructed form of constructed forms of the constructed class named Player—Address, class 1001, which has the format and semantic characteristics given in the class definition of FIG. 3.

The class definition of FIG. 4 shows how nesting of forms can occur in that each field of a form is a form itself and every form may be either primitive and have only one field or constructed and have several fields. In other words, instances of a form may have as many fields as necessary, and each field may have as many subfields as necessary. Further, each subfield may have as many sub-subfields as necessary. This nesting goes on for any arbitrary number of levels. This data structure allows data of arbitrary complexity to be easily represented and manipulated.

Figure 6:
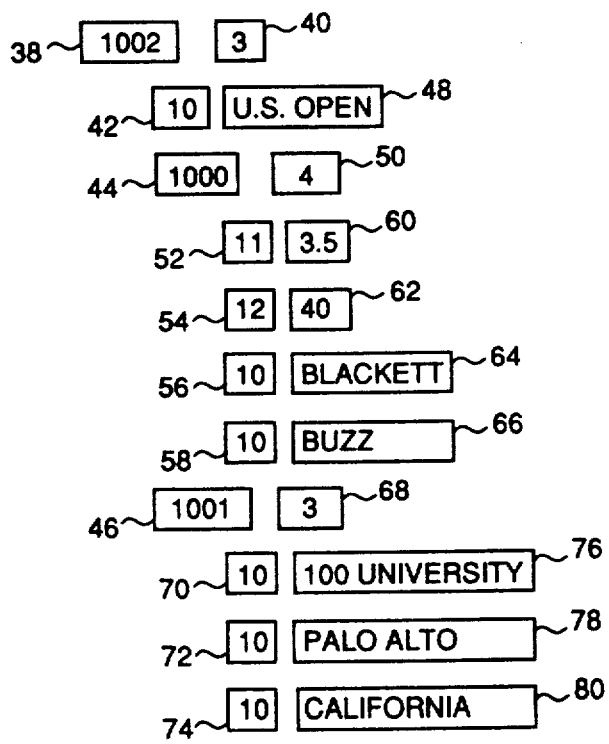
FIG. 6 is an example of a typical form instance as it is stored in memory.

Referring to FIG. 6 there is shown an instance of a form of the class of forms named Tournament—Entry, class 1002, as stored as an object in memory. The block of data 38 contains the constructed class number 1002 indicating that this is an instance of a form of the constructed class named Tournament—Entry. The block of data 40 indicates that this class of form has three fields. Those three fields have blocks of data shown at 42, 44, and 46 containing the class numbers of the forms in these fields. The block of data at 42 indicates that the first field contains a form of class 10 as shown in FIG. 5. A class 10 form is a primitive form containing a 20-character string of ASCII characters as defined in the class definition for class 10 in FIG. 5. The actual string of ASCII characters for this particular instance of this form is shown at 48, indicating that this is a tournament entry for the U.S. Open tennis tournament. The block of data at 44 indicates that the second field contains a form which is an instance of a constructed form of class 1000. Reference to this class definition shows that this class is named Player—Name. The block of data 50 shows that this class of constructed form contains four subfields. Those fields contain forms of the classes recorded in the blocks of data shown at 52, 54, 56 and 58. These fields would be subfields of the field 44. The first subfield has a block of data at 52, indicating that this subfield contains a form of primitive class 11. This class of form is defined in FIG. 5 as containing a floating-point two-digit number with one decimal place. The actual data for this instance of the form is shown at 60, indicating that this player has an NTRP rating of 3.5. The second subfield has a block of data at 54, indicating that this subfield contains a form of primitive class 12. The class definition for this class indicates that the class is named integer and contains integer data. The class definition for class 1000 shown in FIG. 2 indicates that this integer data, shown at block 62, is the player's age. Note that the class definition semantic data regarding field names is not stored in the form instance. Only the format or type information is stored in the form instance in the form of the class ID for each field.

The third subfield has a block of data at 56, indicating that this subfield contains a form of primitive class 10 named String—20—ASCII. This subfield corresponds to the field Last—Name in the form of class Player—Name, class 1000, shown in FIG. 2. The primitive class 10 class definition specifies that instances of this primitive class contain a 20-character ASCII string. This string happens to define the player's last name. In the instance shown in FIG. 6, the player's last name is Blackett, as shown at 64.

The last subfield has a block of data at 58, indicating that the field contains a primitive form of primitive class 10 which is a 20-character ASCII string. This subfield is defined in the class definition of class 1000 as containing the player's first name. This ASCII string is shown at 66.

The third field in the instance of the form of class 1002 has a block of data at 46, indicating that this field contains a constructed form of the constructed class 1001. The class definition for this class is given in FIG. 3 and indicates the class is named Player—Address. The block of data at 68 indicates that this field has three subfields containing forms of the class numbers indicated at 70, 72 and 74. These subfields each contain forms of the primitive class 10 defined in FIG. 5. Each of these subfields therefore contains a 20-character ASCII string. The contents of these three fields are defined in the class definition for class 1001 and are, respectively, the street, city and state entries for the address of the player named in the field 44. These 3-character strings are shown at 76, 78 and 80, respectively.

Figure 7:
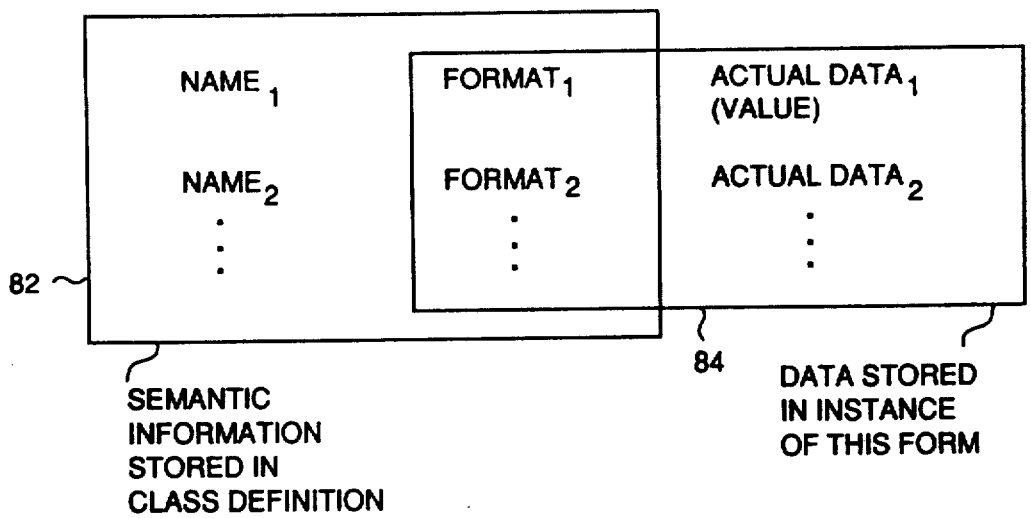
FIG. 7 illustrates the partitioning of semantic data, format data, and actual or value data between the form-class definition and the form instance.

Referring to FIG. 7, there is shown a partition of the semantic information, format information and actual data between the class definition and instances of forms of this class. The field name and format or type information are stored in the class definition, as indicated by box 82. The format or type information (in the form of the class ID) and actual data or field values are stored in the instance of the form as shown by box 72. For example, in the instance of the form of class Tournament—Entry, class 1002 shown in FIG. 6, the format data for the first field is the data stored in block 42, while the actual data for the first field is the data shown at block 48. Essentially, the class number or class ID is equated by the communications interface with the specification for the type of data in instances of forms of that primitive class. Thus, the communications interface can perform format operations on instances of a particular form using only the format data stored in the instance of the form itself without the need for access to the class definition. This speeds up format operations by eliminating the need for the performance of the steps required to access a class definition which may include network access and/or disk access, which would substantially slow down the operation. Since format-type operations comprise the bulk of all operations in exchanging data between foreign processes, the data structure and the library of programs to handle the data structure defined herein greatly increase the efficiency of data exchange between foreign processes and foreign computers.

For example, suppose that the instance of the form shown in FIG. 6 has been generated by a process running on a computer by Digital Equipment Corporation (DEC) and therefoer text is experssed in ASCII characters. Suppose also that this form is to be sent to a process running on an IBM computer, where character strings are expressed in EBCDIC code. Suppose also that these two computers were coupled by a local area network using the ETHERNET TM communications protocol.

To make this transfer, several format operations would have to be performed. These format operations can best be understood by reference to FIG. 1 with the assumption that the DEC computer is host 1 shown at 10 and the IBM computer is host 2 shown at 12.

The first format operation to transfer the instance of the form shown in FIG. 6 from application 16 to application 18 would be a conversion from the format shown in FIG. 6 to a packed format suitable for transfer via network 14. Networks typically operate on messages comprised of blocks of data comprising a plurality of bytes packed together end to end preceded by multiple bytes of header information which include such things as the message length, the destination address, the source address, and so on, and having error correction code bits appended to the end of the message. Sometimes delimiters are used to mark the start and end of the actual data block.

The second format operation which would have to be performed in this hypothetical transfer would be a conversion from the packed format necessary for transfer over network 14 to the format used by the application 18 and the host computer 12.

Format operations are performed by the forms-manager modules of the communications interface. For example, the first format operation in the hypothetical transfer would be performed by the forms-manager module 86 in FIG. 1, while the second format operation in the hypothetical transfer would be performed by the forms-manager module in the data-exchange component 88.

Figure 8:
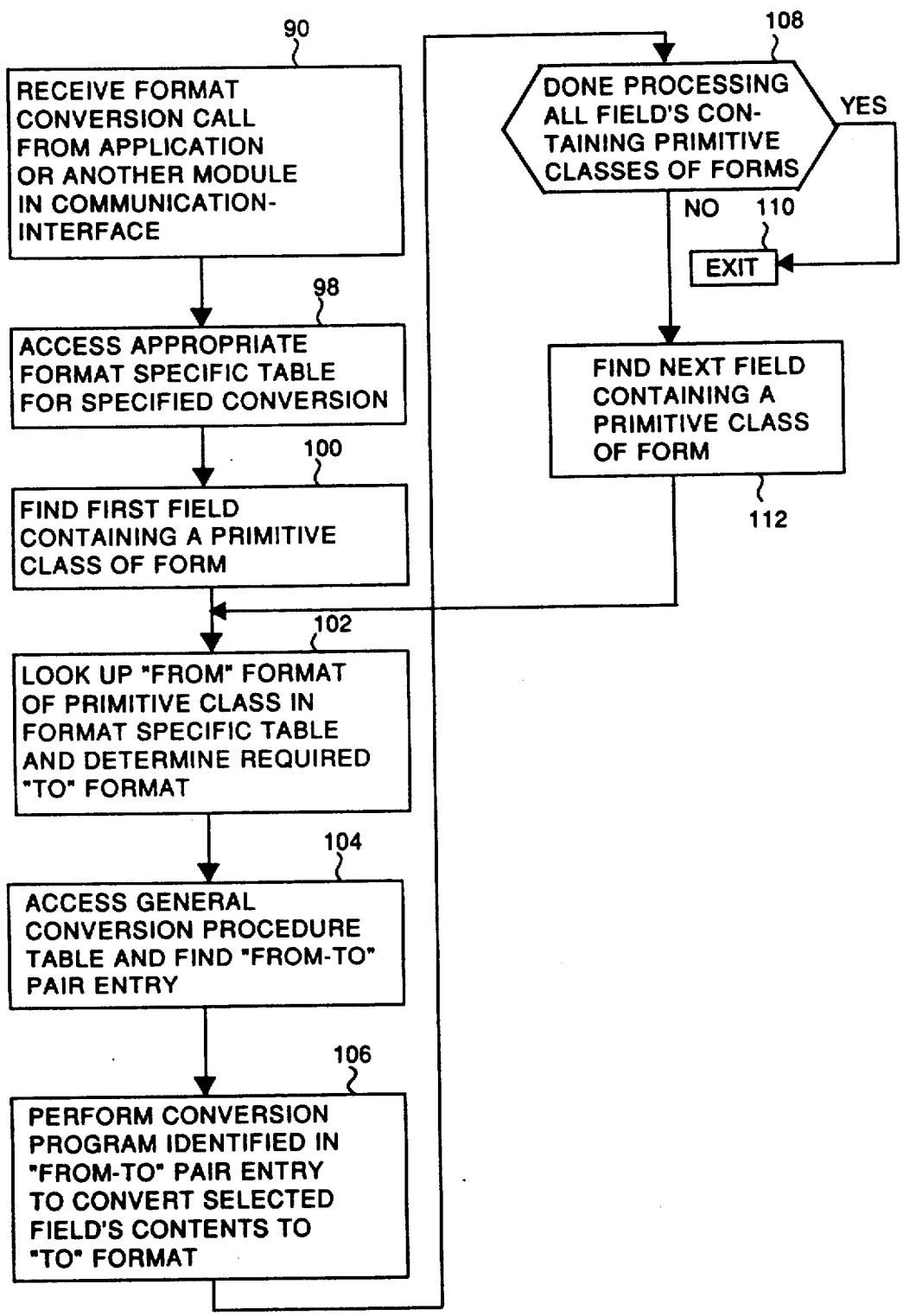
FIG. 8 is a flow chart of processing during a format operation.

Referring to FIG. 8, there is shown a flowchart of the operations performed by the forms-manager modules in performing format operations. Further details regarding the various functional capabilities of the routines in the forms-manager modules of the communications interface will be found in the functional specifications for the various library routines of the communications interface included herein. The process of FIG. 8 is implemented by the software programs in the forms-manager modules of the data-exchange components in the communications interface according to the teachings of the invention. The first step is to receive a format conversion call from either the application or from another module in the communications interface. This process is symbolized by block 90 and the pathways 92 and 94 in FIG. 1. The same type call can be made by the application 18 or the communications component 96 for the host computer 12 in FIG. 1 to the forms-manager module in the data-exchange component 88, since this is a standard functional capability or "tool" provided by the communication interface of the invention to all client applications. Every client application will be linked to a communication interface like interface 20 in FIG. 1.

Typically, format conversion calls from the communication components such as modules 30 and 96 in FIG. 1 to the forms-manager module will be from a service discipline module which is charged with the task of sending a form in format 1 to a foreign application which uses format 2. Another likely scenario for a format conversion call from another module in the communication interface is when a service discipline has received a form from another application or service which is in a foreign format and which needs to be converted to the format of the client application.

The format conversion call will have parameters associated with it which are given to the forms manager. These parameters specify both the "from" format and the "to" or "target" format.

Block 98 represents the process of accessing an appropriate target format-specific table for the specified conversion, i.e., the specified "from" format and the specified "to" format will have a dedicated table that gives details regarding the appropriate target format class for each primitive "from" format class to accomplish the conversion. There are two tables which are accessed sequentially during every format conversion operation in the preferred embodiment. In alternative embodiments, these two tables may be combined. Examples of the two tables used in the preferred embodiment are shown in FIGS. 9, 10 and 11. FIG. 9 shows a specific format conversion table for converting from DEC machines to X.409 format. FIG. 10 shows a format-specific conversion table for converting from X.409 format to IBM machine format. FIG. 11 shows a general conversion procedures table identifying the name of the conversion program in the communications interface library which performs the particular conversion for each "from"-"to" format pair.

The tables of FIGS. 9 and 10 probably would not be the only tables necessary for sending a form from the application 16 to the application 18 in FIG. 1. There may be further format-specific tables necessary for conversion from application 16 format to DEC machine format and for conversion from IBM machine format to application 18 format. However, the general concept of the format conversion process implemented by the forms-manager modules of the communications interface can be explained with reference to FIGS. 9, 10 and 11.

Assume that the first conversion necessary in the process of sending a form from application 16 to application 18 is a conversion from DEC machine format to a packed format suitable for transmission over an ETHERNET TM network. In this case, the format conversion call received in step 90 would invoke processing by a software routine in the forms-manager module which would perform the process symbolized by block 98.

In this hypothetical example, the appropriate format-specific table to access by this routine would be determined by the "from" format and "to" format parameters in the original format conversion call received by block 90. This would cause access to the table shown in FIG. 9. The format conversion call would also identify the address of the form to be converted.

The next step is symbolized by block 100. This step involves accessing the form identified in the original format conversion call and searching through the form to find the first field containing a primitive class of form. In other words, the record is searched until a field is found storing actual data as opposed to another constructed form having subfields.

In the case of the form shown in FIG. 6, the first field storing a primitive class of form is field 42. The "from" column of the table of FIG. 9 would be searched using the class number 10 until the appropriate entry was found. In this case, the entry for a "from" class of 10 indicates that the format specified in the class definition for primitive class 25 is the "to" format. This process of looking up the "to" format using the "from" format is symbolized by block 102 in FIG. 8. The table shown in FIG. 9 may be "hardwired" into the code of the routine which performs the step symbolized by block 102.

Alternatively, the table of FIG. 9 may be a database or other file stored somewhere in the network file system 24 in FIG. 1. In such a case, the routine performing the step 102 in FIG. 8 would know the network address and file name for the file to access for access to the table of FIG. 9.

Next, the process symbolized by block 104 in FIG. 8 is performed by accessing the general conversion procedures table shown in FIG. 11. This is a table which identifies the conversion program in the forms manager which performs the actual work of converting one primitive class of form to another primitive class of form. This table is organized with a single entry for every "from"-"to" format pair. Each entry in the table for a "from"-"to" pair includes the name of the conversion routine which does the actual work of the conversion. The process symbolized by block 104 comprises the steps of taking the "from"-"to" pair determined from access to the format-specific conversion table in step 102 and searching the entries of the general conversion procedures table until an entry having a "from"-"to" match is found. In this case, the third entry from the top in the table of FIG. 11 matches the "from"-"to" format pair found in the access to FIG. 9. This entry is read, and it is determined that the name of the routine to perform this conversion is ASCII_ETHER. (In many embodiments, the memory address of the routine, opposed to the name, would be stored in the table.)

Block 106 in FIG. 8 symbolizes the process of calling the conversion program identified by step 104 and performing this conversion routine to change the contents of the field selected in step 100 to the "to" or target format identified in step 102. In the hypothetical example, the routine ASCII_ETHER would be called and performed by step 106. The call to this routine would deliver the actual data stored in the field selected in the process of step 100, i.e., field 42 of the instance of a form shown in FIG. 6, such that the text string "U.S. Open" would be converted to a packed ETHERNET TM format.

Next, the test of block 108 is performed to determine if all fields containing primitive classes of forms have been processed. If they have, then format conversion of the form is completed, and the format conversion routine is exited as symbolized by block 110.

If fields containing primitive classes of forms remain to be processed, then the process symbolized by block 112 is performed. This process finds the next field containing a primitive class of form.

Thereafter, the processing steps symbolized by blocks 102, 104, 106, and 108 are performed until all fields containing primitive classes of forms have been converted to the appropriate "to" format.

As noted above, the process of searching for fields containing primitive classes of forms proceeds serially through the form to be converted. If the next field encountered contains a form of a constructed class, that class of form must itself be searched until the first field therein with a primitive class of form is located. This process continues through all levels of nesting for all fields until all fields have been processed and all data stored in the form has been converted to the appropriate format. As an example of how this works, in the form of FIG. 6, after processing the first field 42, the process symbolized by block 112 in FIG. 8 would next encounter the field 44 (fields will be referred to by the block of data that contain the class ID for the form stored in that field although the contents of the field are both the class ID and the actual data or the fields and subfields of the form stored in that field). Note that in the particular class of form represented by FIG. 6, the second field 44 contains a constructed form comprised of several subfields. Processing would then access the constructed form of class 1000 which is stored by the second field and proceeds serially through this constructed form until it locates the first field thereof which contains a form of a primitive class. In the hypothetical example of FIG. 6, the first field would be the subfield indicated by the class number 11 at 52. The process symbolized by block 102 would then look up class 11 in the "from" column in the table of FIG. 9 and determine that the target format is specified by the class definition of primitive class 15. This "from"-"to" pair 11-15 would then be compared to the entries of the table of FIG. 11 to find a matching entry. Thereafter, the process of block 106 in FIG. 8 would perform the conversion program called Float1_ETHER to convert the block of data at 60 in FIG. 6 to the appropriate ETHERNET TM packed format. The process then would continue through all levels of nesting.

Figure 12:
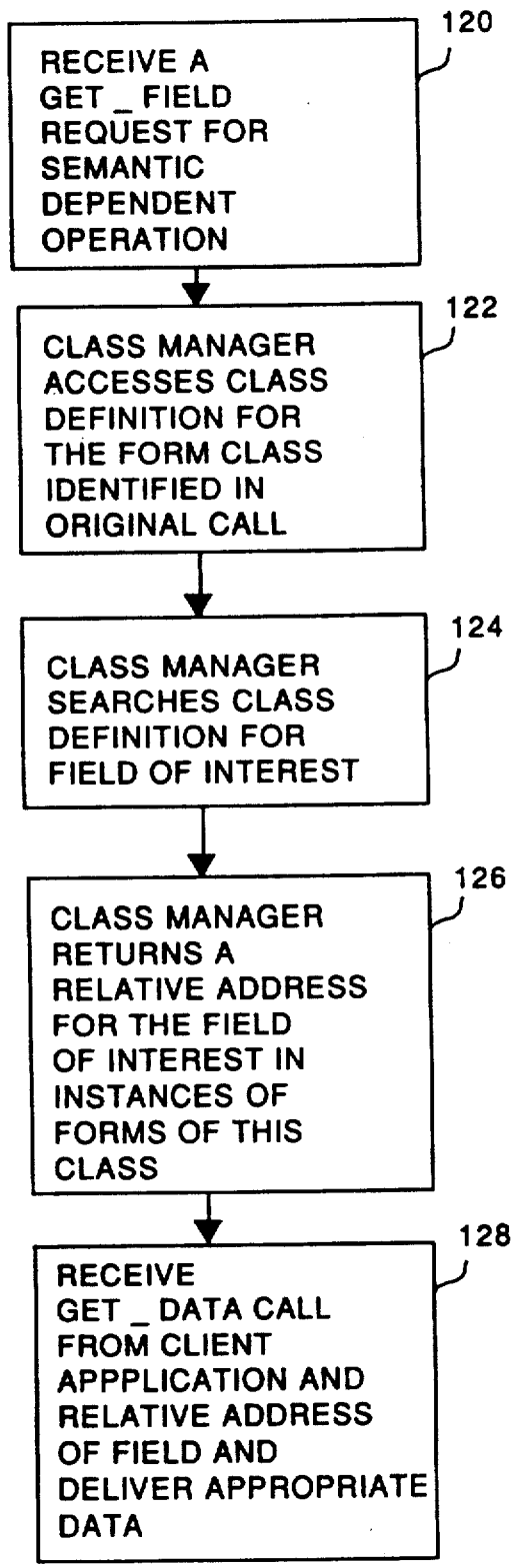
FIG. 12 is a flow chart for a typical semantic-dependent operation.

Referring to FIG. 12, there is shown a flowchart for a typical semantic-dependent operation. Semantic-dependent operations allow decoupling of applications by allowing one application to get the data in a particular field of an instance of a form generated by a foreign application provided that the field name is known and the address of the form instance is known. The communications interface according to the teachings of the invention receives semantic-dependent operation requests from client applications in the form of Get_Field calls in the preferred embodiment where all processes use the same field names for data fields which mean the same thing (regardless of the organization of the form or the data representation of the field in the form generated by the foreign process). In alternative embodiments, an aliasing or synonym table or data base is used. In such embodiments, the Get Field call is used to access the synonym table in the class manager and looks for all synonyms of the requested field name. All field names which are synonyms of the requested field name are returned. The class manager then searches the class definition for a match with either the requested field name or any of the synonyms and retrieves the field having the matching field name.

Returning to consideration of the preferred embodiment, such Get_Field calls may be made by client applications directly to the forms-class manager modules such as the module 122 in FIG. 1, or they may be made to the communications components or forms-manager modules and transferred by these modules to the forms-class manager. The forms-class manager creates, destroys, manipulates, stores and reads form-class definitions.

A Get_Field call delivers to the forms-class manager the address of the form involved and the name of the field in the form of interest. The process of receiving such a request is symbolized by block 120 in FIG. 12. Block 120 also symbolizes the process by which the class manager is given the class definition either programmatically, i.e., by the requesting application, or is told the location of a data base where the class definitions including the class definition for the form of interest may be found. There may be several databases or files in the network file system 24 of FIG. 1 wherein class definitions are stored. It is only necessary to give the forms-class manager the location of the particular file in which the class definition for the form of interest is stored.

Next, as symbolized by block 122, the class-manager module accesses the class definition for the form class identified in the original call.

The class manager then searches the class definition field names to find a match for the field name given in the original call. This process is symbolized by block 124.

After locating the field of interest in the class definition, the class manager returns a relative address pointer to the field of interest in instances of forms of this class. This process is symbolized by block 126 in FIG. 12. The relative address pointer returned by the class manager is best understood by reference to FIGS. 2, 4 and 6. Suppose that the application which made the Get_Field call was interested in determining the age of a particular player. The Get_Field request would identify the address for the instance of the form of class 1002 for player Blackett as illustrated in FIG. 6. Also included in the Get_Field request would be the name of the field of interest, i.e., "age". The class manager would then access the instance of the form of interest and read the class number identifying the particular class descriptor or class definition which applied to this class of forms. The class manager would then access the class descriptor for class 1002 and find a class definition as shown in FIG. 4. The class manager would then access the class definitions for each of the fields of class definition 1002 and would compare the field name in the original Get_Field request to the field names in the various class definitions which make up the class definition for class 1002. In other words, the class manager would compare the names of the fields in the class definitions for classes 10, 1000, and 1001 to the field name of interest, "Age". A match would be found in the class definition for class 1000 as seen from FIG. 2. For the particular record format shown in FIG. 6, the "Age" field would be the block of data 62, which is the tenth block of data in from the start of the record. The class manager would then return a relative address pointer of 10 in block 126 of FIG. 12. This relative address pointer is returned to the client application which made the original Get_Field call. The client application then issues a Get_Data call to the forms-manager module and delivers to the forms-manager module the relative address of the desired field in the particular instance of the form of interest. The forms-manager module must also know the address of the instance of the form of interest which it will already have if the original Get_Field call came through the forms-manager module and was transferred to the forms-class manager. If the forms-manager module does not have the address of the particular instance of the form of interest, then the forms manager will request it from the client application. After receiving the Get_Data call and obtaining the relative address and the address of the instance of the form of interest, the forms manager will access this instance of the form and access the requested data and return it to the client application. This process of receiving the Get_Data call and returning the appropriate data is symbolized by block 128 in FIG. 12.

DATA DISTRIBUTION AND SERVICE PROTOCOL DECOUPLING BY SUBJECT-BASED ADDRESSING AND THE USE OF SERVICE DISCIPLINE PROTOCOL LAYERS

Figure 14:
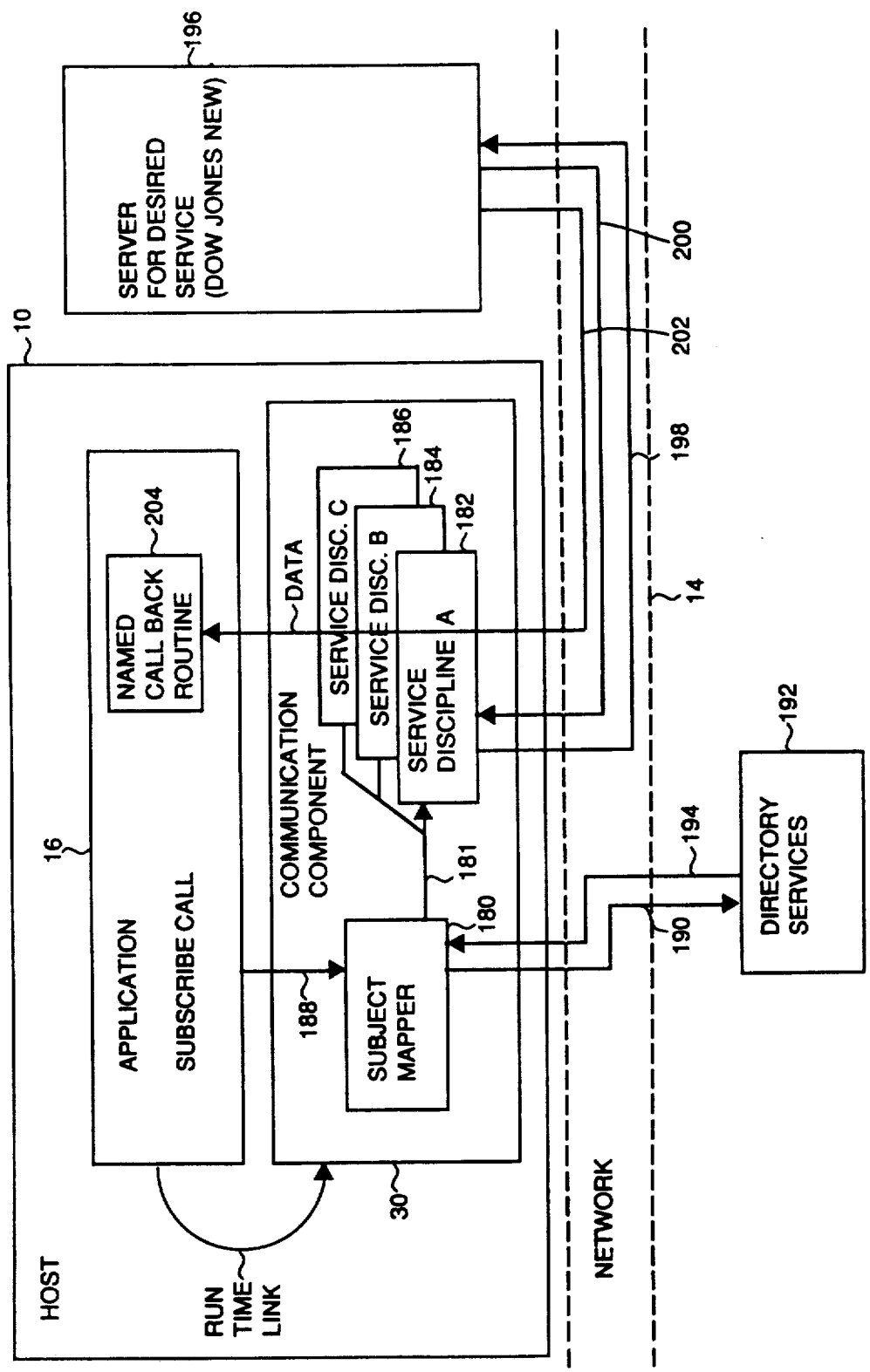
FIG. 14 is a block diagram illustrating the relationships between the subject-mapper module and the service discipline modules of the communication component to the requesting application and the service for subject-based addressing.

Referring to FIG. 14, there is shown a block diagram of the various software modules, files, networks, and computers which cooperate to implement two important forms of decoupling. These forms of decoupling are data distribution decoupling and service protocol decoupling. Data distribution decoupling means freeing client applications from the necessity to know the network addresses for servers providing desired services. Thus, if a particular application needs to know information supplied by, for example, the Dow Jones news service, the client application does not need to know which servers and which locations are providing data from the Dow Jones news service raw data feed.

Service protocol decoupling means that the client applications need not know the particular communications protocols necessary to traverse all layers of the network protocol and the communication protocols used by the servers, services or other applications with which exchanges of data are desired.

Data distribution decoupling is implemented by the communications module 30 in FIG. 14. The communications routines which implement a subject mapper 180 and a plurality of service disciplines to implement subject-based addressing. Service disciplines 182, 184 and 186 are exemplary of the service disciplines involved in subject-based addressing.

Subject-based addressing allows services to be modified or replaced by alternate services providing equivalent information without impacting the information consumers. This decoupling of the information consumers from information providers permits a higher degree of modularization and flexibility than that provided by traditional service-oriented models.

Subject-based addressing starts with a subscribe call 188 to the subject mapper 180 by a client application 16 running on host computer 10. The subscribe call is a request for information regarding a particular subject. Suppose hypothetically that the particular subject was equity.IBM.news. This subscribe call would pass two parameters to the subject mapper 180. One of these parameters would be the subject equity.IBM.news. The other parameter would be the name of a callback routine in the client application 16 to which data regarding the subject is to be passed. The subscribe call to the subject mapper 180 is a standard procedure call.

The purpose of the subject mapper is to determine the network address for services which provide information on various subjects and to invoke the appropriate service discipline routines to establish communications with those services. To find the location of the services which provide information regarding the subject in the subscribe call, the subject mapper 80 sends a request symbolized by line 190 to a directory-services component 192. The directory-services component is a separate process running on a computer coupled to the network 14 and in fact may be running on a separate computer or on the host computer 10 itself. The directory-services routine maintains a data base or table of records called service records which indicate which services supply information on which subjects, where those services are located, and the service disciplines used by those services for communication. The directory-services component 192 receives the request passed from the subject mapper 180 and uses the subject parameter of that request to search through its tables for a match. That is, the directory-services component 192 searches through its service records until a service record is found indicating a particular service or services which provide information on the desired subject. This service record is then passed back to the subject mapper as symbolized by line 194. The directory-services component may find several matches if multiple services supply information regarding the desired subject.

The service record or records passed back to the subject mapper symbolized by line 194 contain many fields. Two required fields in the service records are the name of the service which provides information on the desired subject and the name of the service discipline used by that service. Other optional fields which may be provided are the name of the server upon which said service is running and a location on the network of that server.

Generally, the directory-services component will deliver all the service records for which there is a subject map, because there may not be a complete overlap in the information provided on the subject by all services. Further, each service will run on a separate server which may or may not be coupled to the client application by the same network. If such multiplicity of network paths and services exists, passing all the service records with subject matter matches back to the subject mapper provides the ability for the communications interface to switch networks or switch servers or services in the case of failure of one or more of these items.

As noted above, the subject mapper 180 functions to set up communications with all of the services providing information on the desired subject. If multiple service records are passed back from the directory-services module 192, then the subject mapper 180 will set up communications with all of these services.

Upon receipt of the service records, the subject mapper will call each identified service discipline and pass to it the subject and the service record applicable to that service discipline. Although only three service disciplines 182, 184 and 186 are shown in FIG. 14, there may be many more than three in an actual system.

In the event that the directory-services component 192 does not exist or does not find a match, no service records will be returned to the subject mapper 180. In such a case, the subject mapper will call a default service discipline and pass it the subject and a null record.

Each service discipline is a software module which contains customized code optimized for communication with the particular service associated with that service discipline.

Each service discipline called by the subject mapper 180 examines the service records passed to it and determines the location of the service with which communications are to be established. In the particular hypothetical example being considered, assume that only one service record is returned by the directory-services module 192 and that that service record identifies the Dow Jones news service running on server 196 and further identifies service discipline A at 182 as the appropriate service discipline for communications with the Dow Jones news service on server 196. Service discipline A will then pass a request message to server 196 as symbolized by line 198. This request message passes the subject to the service and may pass all or part of the service record.

The server 196 processes the request message and determines if it can, in fact, supply information regarding the desired subject. It then sends back a reply message symbolized by line 200.

Once communications are so established, the service sends all items of information pertaining to the requested subject on a continual basis to the appropriate service discipline as symbolized by path 202. In the example chosen here, the service running on server 196 filters out only those news items which pertain to IBM for sending to service discipline at 182.

Each service discipline can have a different behavior. For example, service discipline B at 184 may have the following behavior. The service running on server 196 may broadcast all news items of the Dow Jones news service on the network 14. All instances of service discipline B may monitor the network and filter out only those messages which pertain to the desired subject. Many different communication protocols are possible.

The service discipline A at 182 receives the data transmitted by the service and passes it to the named callback routine 204 in the client application 16. (The service discipline 182 was passed the name of the callback routine in the initial message from the mapper 180 symbolized by line 181.) The named callback routine then does whatever it is programmed to do with the information regarding the desired subject.

Data will continue to flow to the named callback routine 204 in this manner until the client application 16 expressly issues a cancel command to the subject mapper 180. The subject mapper 180 keeps a record of all subscriptions in existence and compares the cancel command to the various subscriptions which are active. If a match is found, the appropriate service discipline is notified of the cancel request, and this service discipline then sends a cancel message to the appropriate server. The service then cancels transmission of further data regarding that subject to the service discipline which sent the cancel request.

It is also possible for a service discipline to stand alone and not be coupled to a subject mapper. In this case the service discipline or service disciplines are linked directly to the application, and subscribe calls are made directly to the service discipline. The difference is that the application must know the name of the service supplying the desired data and the service discipline used to access the service. A database or directory-services table is then accessed to find the network address of the identified service, and communications are established as defined above. Although this software architecture does not provide data distribution decoupling, it does provide service protocol decoupling, thereby freeing the application from the necessity to know the details of the communications interface with the service with which data is to be exchanged.

More details on subject-based addressing subscription services provided by the communications interface according to the teachings of the invention are given in Section 4 of the communications interface specification given below. The preferred embodiment of the communications interface of the invention is constructed in accordance with that specification.

In actual subscribe function in the preferred embodiment is done by performing the TIB_Consume_Create library routine described in Section 4 of the specification. The call to TIB_Consume_Create includes a property list of parameters which are passed to it, one of which is the identity of the callback routine specified as My_Message_Handler in Section 4 of the specification.

In the specification, the subject-based addressing subscription service function is identified as TIBINFO. The TIBINFO interface consists of two libraries. The first library is called TIBINFO_CONSUME for data consumers. The second library is called TIBINFO_PUBLISH for data providers. An application includes one library or the other or both depending on whether it is a consumer or a provider or both. An application can simultaneously be a consumer and a provider.

Figure 15:
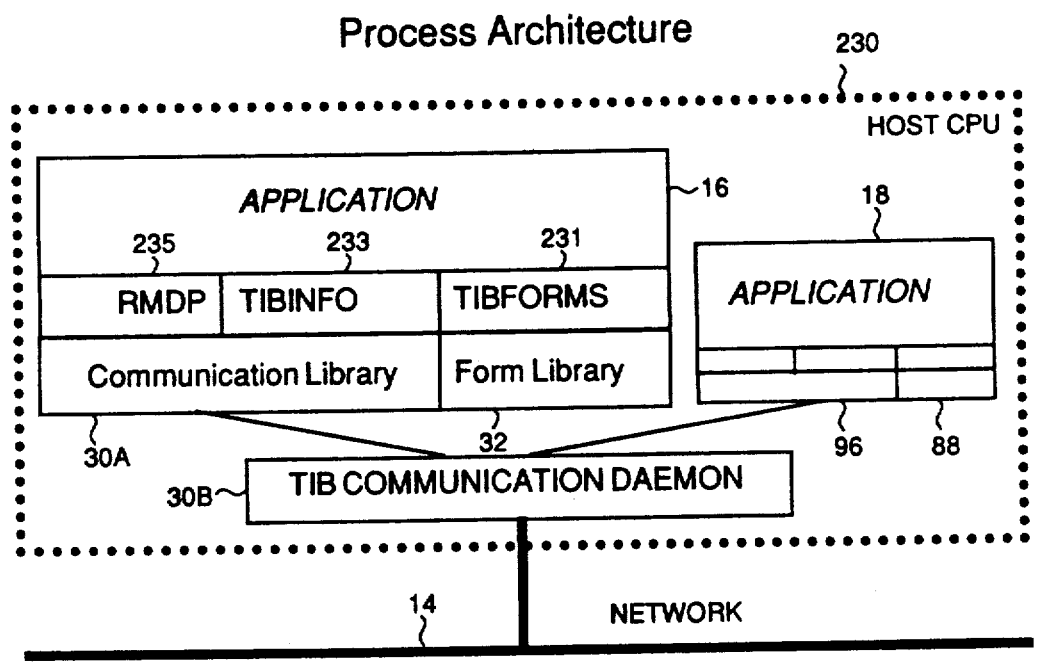
FIG. 15 illustrates the relationship of the various modules, libraries and interfaces of an alternative embodiment of the invention to the client applications.

Referring to FIG. 15, there is shown a block diagram of the relationship of the communications interface according to the teachings of the invention to the applications and the network that couples these applications. Blocks having identical reference numerals to blocks in FIG. 1 provide similar functional capabilities as those blocks in FIG. 1. The block diagram in FIG. 15 shows the process architecture of the preferred embodiment. The software architecture corresponding to the process architecture given in FIG. 15 is shown in block form in FIG. 16.

Referring to FIG. 15, the communications component 30 of FIG. 1 is shown as two separate functional blocks 30A and 30B in FIG. 15. That is, the functions of the communications component 30 in FIG. 1 are split in the process architecture of FIG. 15 between two functional blocks. A communications library 30A is linked with each client application 16, and a backend communications daemon process 30B is linked to the network 14 and to the communication library 30A. There is typically one communication daemon per host processor. This host processor is shown at 230 in FIG. 15 but is not shown at all in FIG. 16. Note that in FIG. 15, unlike the situation in FIG. 1, the client applications 16 and 18 are both running on the same host processor 230. Each client application is linked to its own copies of the various library programs in the communication libraries 30A and 96 and the form library of the data-exchange components 32 and 88. These linked libraries of programs share a common communication daemon 30B.

The communication daemons on the various host processors cooperate among themselves to insure reliable, efficient communication between machines. For subject addressed data, the daemons assist in its efficient transmission by providing low-level system support for filtering messages by subject.

The communication library 30A performs numerous functions associated with each of the application-oriented communication suites. For example, the communication library translates subjects into efficient message headers that are more compact and easier to check than ASCII subject values. The communications library also maps service requests into requests targeted for particular service instances, and monitors the status of those instances.

The data-exchange component 32 of the communications interface according to the teachings of the invention is implemented as a library called the "form library." This library is linked with the client application and provides all the core functions of the data-exchange component. The form library can be linked independently of the communication library and does not require the communication daemon 30B for its operation.

The communication daemon serves in two roles. In the subject-based addressing mode described above where the service instance has been notified of the subject and the network address to which data is to be sent pertaining to this subject, the communication daemon 30B owns the network address to which the data is sent. This data is then passed by the daemon to the communication library bound to the client application, which in turn passes the data to the appropriate callback routine in the client application. In another mode, the communication daemon filters data coming in from the network 14 by subject when the service instances providing data are in a broadcast mode and are sending out data regarding many different subjects to all daemons on the network.

The blocks 231, 233 and 235 in FIG. 15 represent the interface functions which are implemented by the programs in the communication library 30A and the form library 32. The TIBINFO interface 233 provides subject-based addressing services by the communication paradigm known as the subscription call. In this paradigm, a data consumer subscribes to a service or subject and in return receives a continuous stream of data about the service or subject until the consumer explicitly terminates the subscription (or a failure occurs) A subscription paradigm is well suited to real-time applications that monitor dynamically changing values, such as a stock price. In contrast, the more traditional request/reply communication is ill suited to such real-time applications, since it requires data consumers to "poll" data providers to learn of changes.

Figure 16:
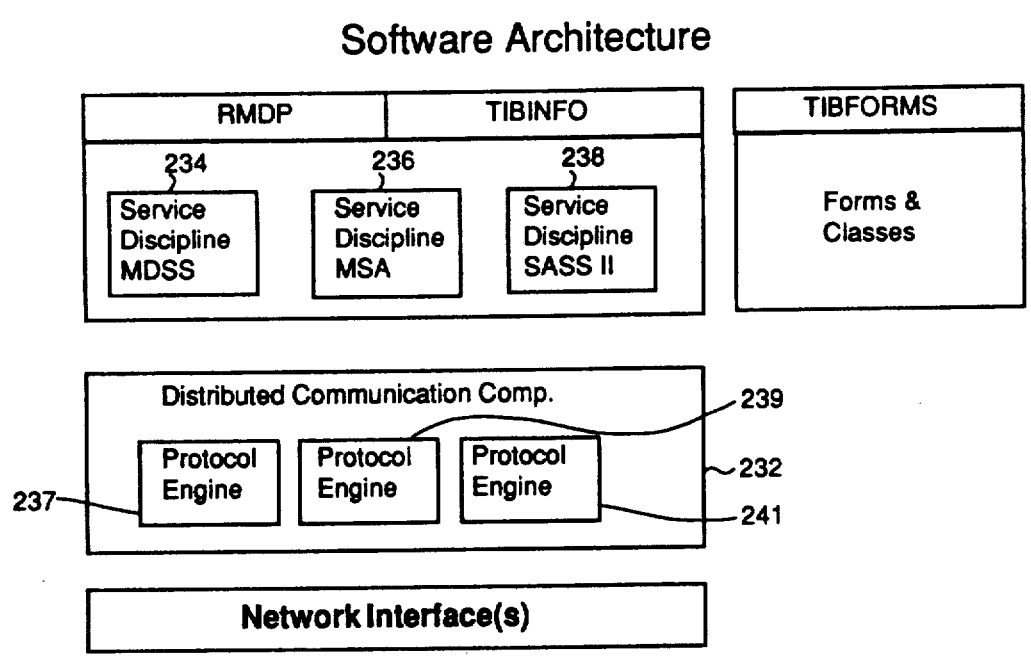
FIG. 16 illustrates the relationships of various modules inside the communication interface of an alternative embodiment.

The interface 235 defines a programmatic interface to the protocol suite and service comprising the Market Data Subscription Service (MDSS) sub-component 234 in FIG. 16. This service discipline will be described more fully later. The RMDP interface 235 is a service address protocol in that it requires the client application to know the name of the service with which data is to be exchanged.

In FIG. 16 there is shown the software architecture of the system. A distributed communications component 232 includes various protocol engines 237, 239 and 241. A protocol engine encapsulates a communication protocol which interfaces service discipline protocols to the particular network protocols. The distributed component 232 is coupled to a variety of service disciplines 234, 236 and 238. The service discipline 234 has the behavior which will herein be called Market Data Subscription Service. This protocol allows data consumers to receive a continuous stream of data, tolerant of individual data sources. This protocol suite provides mechanisms for administering load-balancing and entitlement policies.

The service discipline labeled MSA, 236, has yet a different behavior. The service discipline labeled SAS-SII, 238, supports subject-based address subscription services as detailed above.

The software architecture detailed in FIGS. 15 and 16 represents an alternative embodiment to the embodiment described above with reference to FIGS. 1-14.

Normally, class-manager modules store the class definitions needed to do semantic-dependent operations in RAM of the host machine as class descriptors. Class definitions are the specification of the semantic and formation information that define a class. Class descriptors are memory objects which embody the class definition. Class descriptors are stored in at least two ways. In random access memory (RAM), class descriptors are stored as forms in the format native to the machine and client application that created the class definition. Class descriptors stored on disk or tape are stored as ASCII strings of text.

When the class-manager module is asked to do a semantic-dependent operation, it searches through its store of class descriptors in RAM and determines if the appropriate class descriptor is present. If it is, this class descriptor is used to perform the operation detailed above with reference to FIG. 12. If the appropriate class descriptor is not present, the class manager must obtain it. This is done by searching through known files of class descriptors stored in the system files 24 in FIG. 1 or by making a request to the foreign application that created the class definition to send the class definition to the requesting module. The locations of the files storing class descriptors are known to the client applications, and the class-manager modules also store these addresses. Often, the request for a semantic-dependent operation includes the address of the file where the appropriate class descriptor may be found. If the request does not contain such an address, the class manager looks through its own store of class descriptors and through the files identified in records stored by the class manager identifying the locations of system class descriptor files.

If the class manager asks for the class descriptor from the foreign application that generated it, the foreign application sends a request to its class manager to send the appropriate class descriptor over the network to the requesting class manager or the requesting module. The class descriptor is then sent as any other form and used by the requesting class manager to do the requested semantic-dependent operation.

If the class manager must access a file to obtain a class descriptor, it must also convert the packed ASCII representation in which the class descriptors are stored on disk or tape to the format of a native form for storage in RAM. This is done by parsing the ASCII text to separate out the various field names and specifications of the field contents and the class numbers.

Figures 13A, 13B:
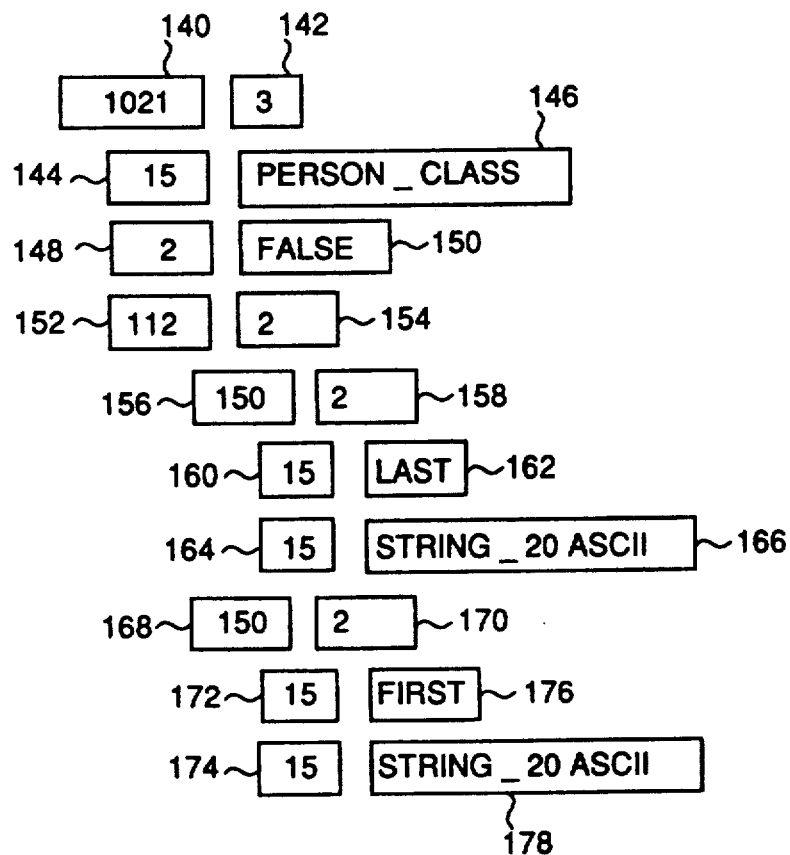
FIGS. 13A and 13B are, respectively, a class definition and the class descriptor form which stores this class definition.

FIGS. 13A and 13B illustrate, respectively, a class definition and the structure and organization of a class descriptor for the class definition of FIG. 13A and stored in memory as a form. The class definition given in FIG. 13A is named Person_Class and has only two fields, named last and first. Each of these fields is specified to store a 20-character ASCII string.

FIG. 13B has a data block 140 which contains 1021 indicating that the form is a constructed form having a class number 1021. The data block at 142 indicates that the form has 3 fields. The first field contains a primitive class specified to contain an ASCII string which happens to store the class name, Person_Class, in data block 146. The second field is of a primitive class assigned the number 2, data block 148, which is specified to contain a boolean value, data block 150. Semantically, the second field is defined in the class definition for class 1021 to define whether the form class is primitive (true) or constructed (false) In this case, data block 150 is false indicating that class 1021 is a constructed class. The third field is a constructed class given the class number 112 as shown by data block 152. The class definition for class 1021 defines the third field as a constructed class form which gives the names and specifications of the fields in the class definition. Data block 154 indicates that two fields exist in a class 112 form. The first field of class 112 is itself a constructed class given the class number 150, data block 156, and has two subfields, data block 158. The first subfield is a primitive class 15, data block 160, which is specified in the class definition for class 1-50 to contain the name of the first field in class 1021. Data block 162 gives the name of the first field in class 1021. The second subfield is of primitive class 15, data block 164, and is specified in the class definition of class 150 (not shown) to contain an ASCII string which specifies the representation, data block 166, of the actual data stored in the first field of class 1021. The second field of class 112 is specified in the class definition of class 112 to contain a constructed form of class 150, data block 168, which has two fields, data block 170, which give the name of the next field in class 1021 and specify the type of representation of the actual data stored in this second field.

There follows a more detailed specification of the various library programs and the overall structure and functioning of an embodiment of the communication interface according to the teachings of the invention.

Information Driven Architecture TM, Teknekron Information Bus TM, TIB TM, TIBINFO TM, TIB-FORMS TM, Subject-Based Addressing TM, and RMDP TM are trademarks of Teknekron Software Systems, Inc.

CONTENTS

1. Introduction
2. Teknekron Information Bus Architecture
3. Reliable Market Data Protocol:RMDP
4. Subject-Addressed Subscription Service:TIBINFO
5. Data-exchange Component:TIBFORM

1. Introduction

The Teknekron Information Bus TM (TIB TM) is a distributed software component designed to facilitate the exchange of data among applications executing in a real-time, distributed environment. It is built on top of industry standard communication protocols (TCP/IP) and data-exchange standards (e.g., X.400).

This document describes a "prerelease" version of the TIB Application Programmatic Interface (API) and contains interface descriptions of all core TIB components. It has been distributed for information purposes only. Readers should note that the interfaces described herein are subject to change. Although Teknekron does not anticipate any major changes to the interface specification contained herein, it does expect minor changes to be suggested and implemented as a result of the distribution process.

The document is organized as follows. Section 2 gives an architectural overview of the TIB. Section 3 describes the Reliable Market Data Protocol. This general purpose protocol is particularly well suited to the requirements of the page-based market data services. It is also often used for bulletin and report distribution. Section 4 describes TIBINFO, an interface supporting Subject-based Addressing. Section 5 describes a component and its interface that supports a very flexible and extensible data-exchange standard. This component is called TIBFORMS.

2. Architectural Overview

2.1 Introduction

The Teknekron Information Bus (TIB) is comprised of two major components: the (application-oriented) data communication component and the data-exchange component. In addition, a set of presentation tools and a set of support utilities have been built around these components to assist the application developer in the writing of TIB-based applications.

The (application-oriented) data communication component implements an extensible framework for implementing high-level, communication protocol suites. Two protocol suites have been implemented that are tailored toward the needs of fault-tolerant, real-time applications that communicate via messages. Specifically, the suites implement subscription services that provide communication support for monitoring dynamically changing values over a network. Subscription services implement a communication paradigm well suited to distributing market data from, for example, Quotron or Telerate.

One of the protocol suites supports a traditional service-oriented cooperative processing model. The other protocol suite directly supports a novel information-oriented, cooperative processing model by implementing subject-based addressing. Using this addressing scheme, applications can request information by subject through a general purpose interface. Subject-based addressing allowing information consumers to be decoupled from information producers thereby, increasing the modularity and extensibility of the system.

The application-oriented protocol suites are built on top of a common set of communication facilities called the distributed communications component. In addition to providing reliable communications protocols, this layer provides location transparency and network independence to its clients.

The layer is built on top of standard transport-layer protocols (e.g., TCP/IP) and is capable of supporting multiple transport protocols. The data-exchange component implements a powerful way of representing and transmitting data. All data is encapsulated within self-describing data objects, called TIB-forms or, more commonly, simply forms. Since TIB forms are self-describing, they admit the implementation of generic tools for data manipulation and display. Such tools include communication tools for sending forms between processes in a machine-independent format. Since a self-describing form can be extended without adversely impacting the applications using it, forms greatly facilitate modular application development.

The two major components of TIB were designed so that applications programmers can use them independently or together. For example, forms are not only useful for communicating applications that share data, but also for non-communicating applications that desire to use the generic tools and modular programming techniques supported by forms. Such applications, of course, do not need the communication services of the TIB. Similarly, applications using subject-based addressing, for example, need not transmit forms, but instead can transmit any data structure. Note that the implementation of the communication component does use forms, but it does not require applications to use them.

2.2 System Model

The system model supported by the TIB consists of users, user groups, networks, services, service instances (or servers), and subjects.

The concept of a user, representing a human "end-user," is common to most systems. A user is identified by a user-id. The TIB user-id is normally the same as the user-id (or logon id) supported by the underlying operating system, but it need not be.

Each user is a member of a exactly one group. The intention is that group should be composed of users with similar service access patterns and access rights. Access rights to a service or system object are grantable at the level of users and at the level of groups. The system administrator is responsible for assigning users to groups.

A network is a logical concept defined by the underlying transport layer and is supported by the TIB. An application can send or receive across any of the networks that its host machine is attached to. It also supports all gateways functions and internetwork routing that is supported by the underlying transport-layer protocols.

Since the lowest layer of the TIB communication component supports multiple networks, application-oriented protocols can be written that transparently switchover from one network to another in the event of a network failure.

A service represents a meaningful set of functions that are exported by an application for use by its clients. Examples of services are an historical news retrieval service, a Quotron datafeed, and a trade ticket router. An application will typically export only one service, although it can export many different services.

A service instance is an application process capable of providing the given service. (Sometimes these are called "server processes.") For a given service, several instances may be concurrently providing it, so as to improve performance or to provide fault tolerance. Application-oriented communication protocols in the TIB can implement the notion of a "fault-tolerant" service by providing automatic switchover from a failed service instance to an operational one providing the same service.

Networks, services, and servers are traditional components of a system model and are implemented in one fashion or another in most distributed systems. On the other hand, the notion of a subject is novel to the information model implemented by the TIB.

The subject space consists of a hierarchical set of subject categories. The current release of the TIB supports a 4 level hierarchy, as illustrated by the following well formed subject: "equity.ibm.composite.trade." The TIB itself enforces no policy as to the interpretation of the various subject categories. Instead, the applications have the freedom and responsibility to establish conventions on use and interpretation of subject categories.

Each subject is typically associated with one or more services producing data about that subject. The subject-based protocol suites of the TIB are responsible for translating an application's request for data on a subject into communication connections to one or more service instances providing information on that subject.

A set of subject categories is referred to as a subject domain. The TIB provides support for multiple subject domains. This facility is useful, for example, when migrating from one domain to another domain. Each domain can define domain-specific subject encoding functions for efficiently representing subjects in message headers.

2.3 Process Architecture

The communication component of the TIB is a truly distributed system with its functions being split between a frontend TIB/communication library, which is linked with each application, and a backend TIB/communication daemon process, for which there is typically one per host processor. Note that this functional split between TIB library and TIB daemon is completely transparent to the application. In fact, the application is completely unaware of the existence of the TIB daemon, with the exception of certain failure return codes.

The TIB daemons cooperate among themselves to ensure reliable, efficient communication between machines. For subject-addressed data, they assist in its efficient transmission by providing low-level system support for filtering messages by subject.

The TIB/communication library performs numerous functions associated with each of the application-oriented communication suites. For example, the library translates subjects into efficient message headers that are more compact and easier to check than ASCII subject values. It also maps service requests into requests targeted for particular service instances, and monitors the status of those instances.

The data-exchange component of TIB is implemented as a library, call the TIB/form library, that is linked with the application. This library provides all of the core functions of the data-exchange component and can be linked independently of the TIB/communication library. The TIB/form library does not require the TIB/communication daemon.

2.4 Communication Component

The TIB Communication Component consists of 3 subcomponents: the lower-level distributed communication component (DCC), and two high-level application-oriented communication protocol suites-the Market Data Subscription Service (MDSS), and the Subject-Addressed Subscription Service (SASS).

The high-level protocol suites are tailored around a communication paradigm known as a subscription. In this paradigm, a data consumer "subscribes" to a service or subject, and in return receives a continuous stream of data about the service or subject until the consumer explicitly terminates the subscription (or a failure occurs). A subscription paradigm is well suited for realtime applications that monitor dynamically changing values, such as a stock's price. In contrast, the more traditional request/reply communication paradigm is ill-suited for such realtime applications, since it requires data consumers to "poll" data providers to learn of changes.

The principal difference between the two high-level protocols is that the MDSS is service-oriented and SASS is subject-oriented. Hence, for example, MDSS supports the sending of operations and messages to services, in addition to supporting subscriptions; whereas, SASS supports no similar functionality.

2.4.1 Market Data Subscription Service

2.4.1.1 Overview

MDSS allows data consumers to receive a continuous stream of data, tolerant of failures of individual data sources. This protocol suite provides mechanisms for administering load balancing and entitlement policies.

Two properties distinguish the MDSS protocols from the typical client/server protocols (e.g. RPC). First, subscriptions are explicitly supported, whereby changes to requested values are automatically propagated to clients. Second, clients request (or subscribe) to a service, as opposed to a server, and it is the responsibility of the MDSS component to forward the client's request to an available server. The MDSS is then responsible for monitoring the server connection and reestablishing if it fails, using a different server, if necessary.

The MDSS has been designed to meet the following important objectives:

(1) Fault tolerance. By supporting automatic switchover between redundant services, by explicitly supporting dual (or triple) networks, and by utilizing the fault-tolerant transmission protocols implemented in the DCC (such as the "reliable broadcast protocols"), the MDSS ensures the integrity of a subscription against all single point failures. An inopportune failure may temporarily disrupt a subscription, but the MDSS is designed to detect failures in a timely fashion and to quickly search for an alternative communication path and/or server. Recovery is automatic as well.

(2) Load balancing. The MDSS attempts to balance the load across all operational servers for a service. It also rebalances the load when a server fails or recovers. In addition, the MDSS supports server assignment policies that attempts to optimize the utilization of scarce resources such as "slots" in a page cache or bandwidth across an external communication line.

(3) Network efficiency. The MDSS supports the intelligent multicast protocol implemented in the DCC. This protocol attempts to optimize the limited resources of both network bandwidth and processor I/O bandwidth by providing automatic, dynamic switchover from point-to-point communication protocols to broadcast protocols. For example, the protocol may provide point-to-point distribution of Telerate page 8 to the first five subscribers and then switch all subscribers to broadcast distribution when the sixth subscriber appears.

(4) High-level communication interface. The MDSS implements a simple, easy-to-use application development interface that mask most of the complexities of programming a distributed system, including locating servers, establishing communication connections, reacting to failures and recoveries, and load balancing.

2.4.1.2 Functionality

The MDSS supports the following core functions:

get    MDSS establishes a fault-tolerant connection to a server for the specified service and "gets" (i.e., retrieves) the current value of the specified page or data element. The connection is subscription based so that updates to the specified page are automatically forwarded.

halt    "halt" the subscription to the specified service.

derive    sends a modifier to the server that could potentially change the subscription.

The MDSS protocol has been highly-optimized to support page-oriented market data feed, and this focus has been reflected in the choice of function names. However, the protocol suite itself is quite general and supports the distribution of any type of data. Consequently, the protocol suite is useful and is being used in other contexts (e.g., data distribution in an electronic billboard).

2.4.2 Subject-Addressed Subscription Service (SASS)

2.4.2.1 Overview

The SASS is a sophisticated protocol suite providing application developers a very high-level communications interface that fully supports the information-oriented, cooperative processing model. This is achieved through the use of subject-based addressing.

The basic idea behind subject-based addressing and the SASS's implementation of it is straightforward. Whenever an application requires a piece of data, especially, data that represents a dynamically changing value (e.g. a stock price), the application simply subscribes to that data by specifying the appropriate subject. For example, in order to receive all trade tickets on IBM, an application may issue the following subscription: "trade_ticket.IBM". Once an application has subscribed to a particular subject, it is the responsibility of the SASS to choose one or more service instances providing information on that subject. The SASS then makes the appropriate communications connections and (optionally) notifies the service instances providing the information.

The SASS has been designed to meet several important objectives:

(1) Decoupling information consumers from information providers. Through the use of subject-based addressing, information consumers can request information in a way that is independent of the application producing the information. Hence, the producing application can be modified or supplanted by a new application providing the same information without affecting the consumers of the information.

(2) Efficiency. Support for filtering messages by subject is built into the low levels of the TIB daemon, where it can be very efficient. Also, the SASS supports filtering data at the producer side: data that is not currently of interest to any application can simply be discarded prior to placing in on the network; thereby, conserving network bandwidth and processor I/O bandwidth.

(3) High-level communication interface. The SASS interface greatly reduces the complexities of programming a distributed application in three ways. First, the consumer requests information by subject, as opposed to by server or service. Specifying information at this level is easier and more natural than at the service level. Also, it insulates the program from changes in service providers (e.g., a switch from IDN to Ticker 3 for equity prices). Second, the SASS presents all data through a simple uniform interface-a programmer needing information supplied by three services need not learn three service-specific protocols, as he would in a traditional processing model. Third, the SASS automates many of the hard or error-prone tasks, such as searching for an appropriate service instance, and establishing the correct communication connection.

2.4.2.2 Functionality

For a data consumer, the SASS provides three basic functions:

subscribe where the consumer requests information on a real-time basis on one or more subjects. The SASS components sets up any necessary communication connections to ensure that all data matching the given subject(s) will be delivered to the consumer. The consumer can specify that data be delivered either asynchronously (interrupt-driven) or synchronously. A subscription may result in the producer service instance being informed of the subscription. This occurs whenever the producer has set up a registration procedure for its service. This notification of the producer via any specified registration procedure is transparent to the consumer.

cancel which is the opposite of subscribe. The SASS component gracefully closes down any dedicated communication channels, and notifies the producer if an appropriate registration procedure exists for the service.

receive receive and "callbacks" are two different ways for applications to receive messages matching their subscriptions. Callbacks are asynchronous and support the event driven programming style-a style that is particularly well-suited for applications requiring realtime data exchange. "Receive" supports a traditional synchronous interface for message receipt. For a data producer, the SASS provides a complementary set of functions.

Note that an application can be both a producer and a consumer with respect to the SASS, and this is not uncommon.

2.4.3 Distributed Communication Component

2.4.3.1 Overview

The Distributed Communication Component (DCC) provides communication services to higher-level TIB protocols, in particular, it provide several types of fault transport protocols.

The DCC is based on several important objectives:

(1) The provision of a simple, stable, and uniform communication model. This objective offers several benefits. First, it offers increased programmer productivity by shielding developers from the complexities of a distributed environment; locating a target process, establishing communications with it, and determining when something has gone awry are all tasks best done by a capable communications infrastructure, not by the programmer. Second, it reduces development time, not only by increasing programmer productivity, but also by simplifying the integration of new features. Finally, it enhances configurability by keeping applications unaware of the physical distribution of other components. This prevents developers from building in dependencies based on a particular physical configuration. (Such dependencies would complicate subsequent reconfigurations.)

(2) Portability through encapsulation of important system structures. This objective achieves importance when migration to a new hardware or software environment becomes necessary. The effort expended in shielding applications from the specific underlying communication protocols and access methods pays off handsomely at that time. By isolating the required changes in a small portion of the system (in this case, the DCC), applications can be ported virtually unchanged, and the firm's application investment is protected.

(3) Efficiency. This is particular important in this component. To achieve this, the DCC builds on top of less costly "connectionless" transport protocols in standard protocol suites (e.g., TCP/IP and OSI). Also, the DCC has been carefully designed to avoid the most costly problem in protocols: the proliferation of data "copy" operations.

The DCC achieves these objectives by implementing a layer of services on top of the basic services provided by vendor-supplied software. Rather than re-inventing basic functions like reliable data transfer or flow-control mechanisms, the DCC concentrates on shielding applications from the idiosyncrasies of any one particular operating system. Examples include the hardware-oriented interfaces of the MS-DOS environment, or the per-process file descriptor limit of UNIX. By providing a single, unified communication tool that can be easily replicated in many hardware or software environment, the DCC fulfills the above objectives.

2.4.3.2 Functionality

The DCC implements several different transmission protocols to support the various interaction paradigms, fault-tolerance requirements, and performance requirements imposed by the high-level protocols. Two of the more interesting protocols are reliable broadcast and intelligent multicast protocols.

Standard broadcast protocols are not reliable and are unable to detect lost messages. The DCC reliable broadcast protocols ensure that all operational hosts either receive each broadcast message or detects the loss of the message. Unlike many so-called reliable broadcast protocols, lost messages are retransmitted on a limited, periodic basis.

The intelligent multicast protocol provides a reliable datastream to multiple destinations. The novel aspect of the protocol is that it can dynamically switch from point-to point transmission to broadcast transmission in order to optimize the network and processor load. The switch from point-to-point to broadcast (and vice versa) is transparent to higher-level protocols. This protocol admits the support of a much larger number of consumers than would be possible using either point-to-point or broadcast alone. The protocol is built on top of other protocols within the DCC.

Currently, all DCC protocols exchange data only in discrete units, i.e., "messages" (in contrast to many Transport protocols). The DCC guarantees that the messages originating from a single process are received in the order sent.

The DCC contains fault-tolerant message transmission protocols that support retransmission in the event of a lost message. The package guarantees "at-most-once" semantics with regards to message delivery and makes a best attempt to ensure "exactly once" semantics.

The DCC contains no exposed interfaces for use by application developers.

3. Reliable Market Data Protocol

3.1 Introduction

The Reliable Market Data Protocol (RMDP) defines a programmatic interface to the protocol suite and services comprising the Market Data Subscription Service (MDSS) TIB subcomponent. RMDP allows market data consumers to receive a continuous stream of data, based on a subscription request to a given service. RMDP tolerates failures of individual servers, by providing facilities to automatically reconnect to alternative servers providing the same service. All the mechanisms for detecting server failure and recovery, and for hunting for available servers are implemented in the RMDP library. Consequently, application programs can be written in a simple and naive way.

The protocol provides mechanisms for administering load balancing and entitlement policies. For example, consider a trading room with three Telerate lines. To maximize utilization of the available bandwidth of those Telerate lines, the system administrator can "assign" certain commonly used pages to particular servers, i.e., page 5 to server A, page 405 to server B, etc. Each user (or user group) would be assigned a "default" server for pages which are not explicitly preassigned. (These assignments are recorded in the TIB Services Directory.)

To accommodate failures, pages or users are actually assigned to prioritized list of servers. When a server experiences a hardware or software failure, RMDP hunts for and connects to the next server on the list. When a server recovers, it announces its presence to all RMDP clients, and RMDP reconnects the server's original clients to it. (Automatic reconnection avoids situations where some servers are overloaded while others are idle.) Except for status messages, failure and recovery reconnections are transparent to the application.

The MDSS protocol suite, including RMDP, is built on top of the DCC and utilizes the reliable communication protocols implemented in that component. In particular, the MDSS suite utilizes the reliable broadcast protocols and the intelligent multicast protocol provided therein. RMDP supports both LANs and wide area networks (WANs). RMDP also supports dual (or multiple) networks in a transparent fashion.

RMDP is a "service-addressed" protocol; a complementary protocol, TIBINFO, supports "subject-based addressing."

3.2 Programmatic Interface

RMDP programs are event-driven. All RMDP function calls are non-blocking: even if the call results in communication with a server, the call returns immediately. Server responses, as well as error messages, are returned at a later time through an application-supplied callback procedure.

The principal object abstraction implemented in RMDP is that of an Rstream, a "reliable stream," of data that is associated with a particular subscription to a specified service. Although, due to failures and recoveries, different servers may provide the subscription data at different times, the Rstream implements the abstraction of a single unified data stream. Except for short periods during failure or recovery reconnection, an Rstream is connected to exactly one server for the specified service. An application may open as many Rstreams as needed, subject only to available memory.

An Rstream is bidirectional—in particular, the RMDP client can send control commands and messages to the connected server over the Rstream. These commands and messages may spur responses or error messages from the server, and in one case, a command causes a "derived" subscription to be generated. Regardless of cause, all data and error messages (whether remotely or locally generated) are delivered to the client via the appropriate Rstream.

The RMDP interface is a narrow interface consisting of just six functions, which are described below.

```
void
rmdp_SetProp(property, value)
rmdp_prop_t property;
caddr_t value;
```

Used to set the values of RMDP properties. These calls must be made before the call to rmdp_Init(). Required properties are marked with ? in the list below. Other properties are optional. The properties currently used are:

*RMDP_CALLBACK

Pointer to the callback function. See the description of callback below.

RMDP_SERVICE_MAP

The name of Services Directory to be used in lieu of the standard directory.

RMDP_GROUP

The user group used to determine the appropriate server list. Should be prefixed with '+'. Default is group is "+" (i.e. the null group).

RMDP_RETRY_TIME

The number of seconds that the client will wait between successive retries to the same server, e.g., in the case of cache full." Default is 30.

RMDP_QUIET_TIME

The time in seconds that a stream may be "quiet" before the protocol assumes that the server has died and initiates a "hunt" for a different server. Default is 75.

RMDP_VERIFY_TIME

The time in seconds between successive pings of the server by the client. Default is 60.

RMDP_APP_NAME

The name of the application i.e. "telerate", "reuters" etc. If this property is set, then the relevant entries from the Service Directory will be cached.

```
void
rmdp_Init();
```

This initializes the internal data structures and must be called prior to any calls to rmdp_Get().

```
RStream
rmdp_Get(service, request, host)
char *service, *request, *host;
```

This is used to get a stream of data for a particular 'service' and subscription 'request'. For the standard market data services, the request will be the name of a page (e.g., "5", "AANN"). If 'host' is non-NULL, then the RMDP will only use the server on the given host. In this case, no reconnection to alternative servers will be attempted upon a server failure. If 'host' is NULL, then RMDP will consult the TIB Services Directory to identify a list of server alternatives for the request. 'rstream' is an opaque value that is used to refer to the stream. All data passed to the application's callback function will be identified by this value.

An error is indicated by RStream rstream=-=NULL.

```
RStream
rmdp_Derive(rstream, op)
RStreamold;
char *op;
```

This generates a new subscription and, hence, a new 'Rstream' from an existing subscription. 'command' is a string sent to the server, where it is interpreted to determine the specific derivation.

The standard market data servers understand the following commands: "n" for next-page, "p" for previous-page and "t XXXX" for time-page.

Derived streams cannot be recovered in the case of server failure. If successful, an Rstream is returned, otherwise NULL is returned.

```
void
rmdp_Message(rstream, msg)
RStreamrstream;
char *msg;
```

Sends the string 'msg' to the server used by 'rstream'. The messages are passed directly to the server, and are not in any way affected by the state of the stream. The messages are understood by the standard market data servers include "π <PAGE NAME>" to rerequest a page, and "q a" to request the server's network address. Some messages induce a response from the server (such as queries). In this case, the response will be delivered to all streams that are connected to the server.

```
void
rmdp_Halt(rstream)
RStreamrstream;
```

This gracefully halts the 'rstream'.

```
void
callback(rstream, msgtype, msg, act, err)
RStreamstream;
mdp_msg_t           msgtype;
char                *msg;
mdp_act_t           act;
mdp_err_t           err;
```

This is the callback function which was registered with rmdp_SetProp(RMDP_CALLBACK, callback). 'rstream' is the stream to which the message pertains. 'msgtype' can be any of the values defined below (see "RMDP Message Type") 'msg' is a string which may contain vt100 compatible escape sequences, as in MDSS. (It will NOT however be prefaced with an [[. . . E. That role is assumed by the parameter 'msgtype'.)

The last two parameters are only meaningful if msgtype, is MDP_MSG_STATUS. 'act' can be any of the values found in "RMDP Action Type" (see below), but special action is necessary only if act=='M-DP_ACT_CANCEL'. The latter indicates that the stream is being canceled and is no longer valid. It is up to the application to take appropriate action. In either case, 'err' can be any of the values found in "RMDP Error Type" (see below), and provides a description of the status.

RMDP Message Types (mdp_msg_t)

The message types are listed below. These types are defined in the underlying (unreliable) Market Data Protocol (MDP) and are exported to the RMDP.

| | |
|---|---|
| MDP_MSG_BAD = −1 | |
| MDP_MSG_DATA = 0 | Page data message. |
| MDP_MSG_STATUS = 1 | Status/error message. |
| MDP_MSG_OOB = 2 | "Out of Band" message, e.g., time stamp. |
| MDP_MSG_QUERY = 3 | Query result. |

RMDP Action Type (mdp_act_t)

The action types are listed below. These action types inform the RMDP clients of activities occurring in the lower level protocols. Generally speaking, they are "for your information only" messages, and do not require additional actions by the RMDP client. The exception is the "MDP_ACT_CANCEL" action, for which there is no recovery. These types are defined in the underlying (unreliable) Market Data Protocol (MDP) and are exported to the RMDP.

| | |
|---|---|
| MDP_ACT_OK = 0 | No unusual action required. |
| MDP_ACT_CANCEL = 1 | The request cannot be serviced, cancel the stream, do not attempt to reconnect. (E.g., invalid page name.) |
| MDP_ACT_CONN_FIRST = 2 | The server is closing the stream; the first server in the alternatives list is being tried. (E.g., the server is shedding "extra" clients for load balancing.) |
| MDP_ACT_CONN_NEXT = 3 | The server is closing the stream; the next server in the alternatives list is being tried. (E.g., the server's line to host fails.) |
| MDP_ACT_LATER = 4 | Server cannot service request at this time; will resubmit request later, or try a different server. (E.g., Cache full.) |
| MDP_ACT_RETRY = 5 | Request is being retried immediately. |

RMDP Error Types (mdp_err_t)
Description of error, for logging or reporting to end user. These types are defined in the underlying (unreliable) Market Data Protocol (MDP) and are exported to the RMDP.
MDP_ERR_OK=0
MDP_ERR_LOW=1
MDP_ERR_QUIET=2
MDP_ERR_INVAL=3
MDP_ERR_RESRC=4
MDP_ERR_INTERNAL=5
MDP_ERR_DELAY=6
MDP_ERR_SYS=7
MDP_ERR_COMM=8

4. Subject-Addressed Subscription Service:TIBINFO

4.1 Introduction

TIBINFO defines a programmatic interface to the protocols and services comprising the TIB subcomponent providing Subject-Addressed Subscription Services (SASS). The TIBINFO interface consists of libraries: TIBINFO_CONSUME for data consumers, and TIBINFO_PUBLISH for data providers. An application includes one library or the other or both depending on whether it is a consumer or provider or both. An application can simultaneously be a consumer and a producer.

Through its support of Subject-Based Addressing, TIBINFO supports a information-oriented model of cooperative processing by providing a method for consumers to request information in a way that is independent of the service (or services) producing the information. Consequently, services can be modified or replaced by alternate services providing equivalent information without impacting the information consumers. This decoupling of information consumers from information providers permits a higher degree of modularization and flexibility than that permitted by traditional service-oriented processing models.

For Subject-Based Addressing to be useful in a real time environment, it must be efficiently implemented. With this objective in mind, support for Subject-Based Addressing has been built into the low levels of the Distributed Communications Component. In particular, the filtering of messages by subject is performed within the TIB daemon itself.

4.2 Concepts

Subject

The subject space is hierarchical. Currently, a 4-level hierarchy is supported of the following format:

major[.minor[.qualifier1[.qualifier2]]]

where '[' and ']' are metacharacters that delimit an optional component. major, minor, qualifier1 and qualifier2 are called subject identifiers. A subject identifier is a string consisting of the printable ascii characters excluding '.', '?', and '*'. A subject identifier can be an empty string, in which case it will match with any subject identifier in that position. The complete subject, including the '.' separators, can not exceed 32 characters. Subjects are case sensitive.

Some example of valid subjects are listed below: The comments refer to the interpretation of subjects on the consume side. (The publish-side semantics are slightly different.)

| | |
|---|---|
| equity.ibm.composite.quote | |
| equity..composite.quote | matches any minor subject |
| equity.ibm | matches any qualifier1 and qualifier2 |
| equity.ibm. | same as above |

Within the TIBINFO and the SASS, subjects are not interpreted. Hence, applications are free to establish conventions on the subject space. It should be noted that SASS components first attempt to match the major and minor subject identifiers first. As a consequence, although applications can establish the convention that "equity.ibm" and "..equity.ibm" are equivalent subjects, subscriptions to "equity.ibm" will be more efficiently processed.

Stream

A stream is an abstraction for grouping subscriptions. The subscriptions on a stream share a common set of properties, notably the same message handler (i.e., "callback" routine) and the same error handler. All subscriptions on a stream can be "canceled" simply by destroying the stream.

A stream imposes little overhead on the system. They can therefore be freely created and destroyed.

Protocol Engines, Service Disciplines, and Subject Mappers

The SASS and DCC components implement many support services in order to provide the functionality in TIBINFO. These include subject mappers for efficiently handling subjects, service disciplines for controlling the interaction with servers, and protocol engines for implementing reliable communication protocols. TIBINFO provides an interface for setting properties of these components. Hence, by setting the appropriate properties, one can specify, for example, the behavior of the subject mapper through the TIBINFO interface. Since these properties are in configuration files, configuration and site dependent parameters can be supported for the above components through TIBINFO.

In the future, the property definitions for TIBINFO and for the underlying components may augmented to support enhancements. This use of properties yields flexibility and extensibility within the confines of a stable functional interface.

4.3 Description

The TIBINFO interface is high-level and easy to use. Published data can be a form or an uninterpreted byte string. Messages can be received either in a synchronous fashion, or in an asynchronous fashion that is suitable for event-driven programming. The following functions are sufficient to write sophisticated consumers using event-driven programming.

Tib_stream *tib_consume_create(property-list, TIB_EOP)

Creates a TIBINFO stream that supports multiple subscriptions via the "subscribe" function. The property_list is a (possibly empty) list of property value pairs, as illustrated by tib_consume_create(TIB_PROP_MSGHAN-
    DLER, my_handler,
TIB_PROP_ERRHANDLER, my_err_handler,
    TIB_EOP);

Valid properties are defined below. TIB EOP is a literal signaling the end of the property list.

| void tib_destroy(stream) | |
|---|---|
| Tib_stream | *stream; |

Reclaims resources used by the specified stream.
Tib_errorcode tib_subscribe(stream, subject, clientdata)

| Tib_stream | *stream; |
|---|---|
| Tib_subject | *subject; |
| caddr_t | clientdata; |

Informs the TIB that the client application is interesting in messages having the indicated subject. If stream has an associated "message-handler," then it will be called whenever a message satisfying the subscription arrives. Qualifying messages are delivered on a first-in/first-out basis. The value of clientdata is returned in every message satisfying the subscription subject. Note that multiple subscriptions to the same subject on the same stream are undefined.

void tib_cancel(stream)

| Tib_stream | *stream; |
|---|---|

Cancels the client application's subscription to the specified subject.

| Tib_stream | *stream; |
|---|---|
| Tib_message | *message; |

This is the "callback" function that was registered with the stream. forms are returned unpacked. The function can reference the entire message structure through the macros described below.

The following functions are sufficient to write producers. Two publishing functions are provided to support the different data types that can be transmitted through the TIB-INFO interface.

tib_publish_create(property-list, TIB_EOP)

Is used to create an TIBINFO stream for publishing records. The property_list is a (possibly empty) list of property-value pairs, as illustrated by tib_publish_create(TIB_PROP_ERRHAND-
    LER,my_handler,TIB_EOP);

Valid properties are defined below. TIB_EOP is a constant signaling the end of the property list.
tib_destroy(stream)

| Tib_stream | stream; |
|---|---|

Reclaims resources used by the specified stream.
Tib_errorcode tib_publish_form(stream, subject, form)

| Tib_stream | *stream; |
|---|---|
| Tib_subject | *subject; |
| Form | form; |

Accepts a single, unpacked form, packs it, and publishes it.
Tib_errorcode tib_publish_buffer(stream, subject, length, form)

| Tib_stream | *stream; |
|---|---|
| Tib_subject | *subject; |
| short | length; |
| Form | form; |

Accepts a byte buffer of specified length and publishes it.

The remaining functions are control functions that apply to both the consume and the publish side.
void Tib_batch()

This may be used prior to initiating multiple subscriptions. It informs the TIB library that it can delay acting on the subscriptions until a tib_unbatch is seen. This allows the TIB library to attempt to optimize the execution of requests. Note that no guarantees are made about the ordering or timing of "batched" request. In particular, (i) requests may be executed prior to the receipt of the tib_unbatch function, and (ii) the effects of changing properties in the middle of a batched sequence of requests is undefined. Batch and unbatch requests may be nested. (Note that the use of tib_batch is completely optional and it does not change the semantics of a correct program.)

Tib_errorcode tib_stream_set(stream, property, value)

| Tib_stream | *stream; |
|---|---|
| Tib_property | *property; |
| caddr_t | value; |

Used to change the dynamically settable properties of a stream. These properties are described below. Note that some properties can only be set prior to stream creation (via tib_default_set) or at stream creation.

caddr_t tib_stream_get(stream, property)

| Tib_stream | *stream; |
|---|---|
| Tib_property | *property; |

Used to retrieve the current value of the specified property.
Tib_errorcode tib_default_set( property, value)

| | |
|---|---|
| Tib_stream | *stream; |
| Tib_property | *property; |
| caddr_t | value; |

Used to change the initial properties of a stream. During stream creation, the default values are used as initial values in the new stream whenever a property value is not explicitly specified in the creation argument list.

Tib_errorcode tib_default_get( property)

| | |
|---|---|
| Tib_stream | *stream; |
| Tib_property | *property; |

Used to retrieve the default value of the specified property.

tib_unbatch()

Informs TIBINFO stop "batching" functions and to execute any outstanding ones.

TIBINFO Attributes

The properties defined by TIBINFO and their allowable values are listed below and are described in detail in the appropriate "man" pages. The last grouping of properties allow the programmer to send default property values and hints to the underlying system components-specifically, the network protocol engines, the TIB subject mapper, and various service disciplines.

| | |
|---|---|
| TIB_PROP_CFILE | cfile-handle |
| TIB_PROP_CLIENTDATA | pointer |
| TIB_PROP_ERRHANDLER | error-handler-routine |
| TIB_PROP_LASTMSG | tib_message pointer |
| TIB_PROP_MSGHANDLER | message-handler-routine |
| TIB_PROP_NETWORK | protocol-engine-property-list |
| TIB_PROP_NETWORK_CFILE | protocol-engine-property-cfile |
| TIB_PROP_SERVICE | service-discipline-property-list |
| TIB_PROP_SERVICE_CFILE | service-discipline-property-cfile |
| TIB_PROP_SUBJECT | subject-property-list |
| TIB_PROP_SUBJECT_CFILE | subject-property-cfile |

TIBINFO Message Structure

The component information of a TIBINFO message can be accessed through the following macros:

tib_msg_clientdata(msg)
tib_msg_subject(msg)
tib_msg_size(msg)
tib_msg_value(msg)

The following macros return TRUE (1) or FALSE (0):

tib_msg_is_buffer(msg)
tib_msg_is_form(msg)

5. TIB Forms

5.1 Introduction

The Forms package provides the tools to create and manipulate self-describing data objects, e.g., forms. Forms have sufficient expressiveness, flexibility and efficiency to describe all data exchanged between the different TIB applications, and also between the main software modules of each application.

The Forms package provides its clients with one data abstraction. Hence, the software that uses the Forms package deal with only one data abstraction, as opposed to a data abstraction for each different type of data that is exchanged. Using forms as the only way to exchange user data, facilitates (i) the integration of new software modules that communicate with other software modules, and (ii) modular enhancement of existing data formats without the need to modify the underlying code. This results in software that is easier to understand, extend, and maintain.

Forms are the principal shared objects in the TIB communication infrastructure and applications; consequently, one of the most important abstractions in the TIB.

The primary objective in designing the forms package were:

Extensibility—It is desirable to be able to change the definition of a form class without recompiling the application, and to be able introduce new classes of forms into the system.

Maintainability—Form-class definition changes may affect many workstations; such changes must be propagated systematically.

Expressiveness—Forms must be capable of describing complex objects; therefore, the form package should support many basic types such as integer, real, string, etc. and also sequences of these types.

Efficiency—Forms should be the most common object used for sending information between processes-both for processes on the same workstation and for processes on different workstations. Hence, forms should be designed to allow the communication infrastructure to send information efficiently.

Note that our use of the term "form" differs from the standard use of the term in database systems and so-called "forms management systems." In those systems, a "form" is a format for displaying a database or file record. (Typically, in such systems, a user brings up a form and paints a database record into the form.)

Our notion of a form is more fundamental, akin to such basic notions as record or array. Our notion takes its meaning from the original meaning of the Latin root word forma. Borrowing from Webster: "The shape and structure of something as distinguished from its material". Forms can be instantiated, operated on, passed as arguments, sent on a network, stored in files and databases. Their contents can also be displayed in many different formats. "templates" can be used to specify how a form is to be displayed. A single form (more precisely, a form class) can have many "templates" since it may need to be displayed in many different ways. Different kinds of users may, for example, desire different formats for displaying a form.

5.2 Description

Forms are self-describing data objects. Each form contains a reference to its formclass, which completely describes the form. Forms also contains metadata that enables the form package to perform most operations without accessing the related formclass definition.

Each form is a member of a specific form class. All forms within a class have the same fields and field's labels (in fact, all defining attributes are identical among the forms of a specific class). Each form class is named and two classes are considered to be distinct if they have distinct names (even though the classes may have identical definitions). Although the forms software does not assign any special meaning or processing support to particular form names, the applications using it might. (In fact, it is expected that certain form naming conventions will be established.)

There are two main classification of forms: primitive versus constructed forms, and fixed length versus variable size forms.

Primitive forms are used to represent primitive data types such as integers, float, strings, etc. Primitive forms contain metadata, in the form header information header and the data of the appropriate type, such as integer, string, etc.

Constructed forms contain sub-forms. A constructed form contains other forms, which in turn can contain subforms.

Fixed length forms are simply forms of a fixed length, e.g., all the forms of a fixed length class occupy the same number of bytes. An example for a fixed length primitive form is the integer form class; integer forms always take 6 bytes, (2 bytes for the form header and 4 bytes for the integer data).

Variable size forms contain variable size data: variable size, primitive forms contain variable size data, such as variable length string; variable size, constructed forms contain a variable number of subforms of a single class. Such forms are similar to an array of elements of the same type.

5.3 Class Identifiers

When a class is defined it is assigned an identifier. This identifier is part of each of the class's form instance, and is used to identify the form's class. This identifier is in addition to its name. Class identifiers must be unique within their context of use. Class identifiers are 2 bytes long; bit 15 is set if the class is fixed length and cleared otherwise; bit 14 is set if the class is primitive and cleared otherwise;

5.4 Assignment semantics

To assign and retrieve values of a form (or a form sequence), "copy" semantics is used. Assigning a value to a form (form field or a sequence element) copies the value of the form to the assigned location-it does not point to the given value.

Clients that are interested in pointer semantics should use forms of the basic type Form Pointer and the function Form_set_data_pointer. Forms of type Form Pointer contain only a pointer to a form; hence, pointer semantics is used for assignment. Note that the C programming language supports pointer semantics for array assignment.

5.5 Referencing a Form Field

A sub-form or field of a constructed form can be accessed by its field name or by its field identifier (the latter is generated by the Forms package). The name of a subform that is not a direct descendent of a given form is the path name of all the fields that contain the requested subform, separated by dot. Note that this is similar to the naming convention of the C language records.

A field identifier can be retrieved given the field's name and using the function Form-class_get_field_id. The direct fields of a form can be traversed by using Form_field_id_first to get the identifier of the first field, and then by subsequently calling Form_field_id_next to get the identifiers of each of the next fields.

Accessing a field by its name is convenient; accessing it by its identifier is fast. Most of the Forms package function references a form field by the field's identifier and not by the field's name.

5.6 Form-class Definition Language

Form classes are specified using the "form-class definition language," which is illustrated below. Even complex forms can be described within the simple language features depicted below. However, the big attraction of a formal language is that it provides an extensional framework: by adding new language constructs the descriptive power of the language can be greatly enhanced without rendering previous descriptions incompatible.

A specification of a form class includes the specification of some class attributes, such as the class name, and a list of specifications for each of the class's fields. Three examples are now illustrated:

```
{
short {
          IS_FIXED              true;
          IS_PRIMITIVE          true;
          DATA_SIZE             2;
          DATA_TYPE             9;
          }
short_array { # A variable size class of shorts.
          IS_FIXED              false;
          FIELDS {
          {
                    FIELD_CLASS_NAME short;
          }
          }}
example_class {
          IS_FIXED              true;
          FIELDS {
          first {
                    FIELD_CLASS_NAME short;
          }
          second {
                    FIELD_CLASS_NAME short_array;
          }
          third {
                    FIELD_CLASS_NAME string_30;
          }
          fourth {
                    FIELD_CLASS_NAME integer;
          }
          }
}}
```

To specify a class, the class's name, a statement of fixed or variable size, and a list of fields must be given. For primitive classes the data type and size must also be specified. All the other attributes may be left unspecified, and defaults will be applied. To define a class field, either the field class name or id must be specify.

The form-class attributes that can be specified are:

The class name.

CLASS_ID—The unique short integer identifier of the class. Defaults to a package specified value.

IS_FIXED—Specifies whether its a fixed or variable size class. Expects a boolean value. This is a required attribute.

IS_PRIMITIVE—Specifies whether its a primitive or constructed class. Expects a boolean value. Defaults to False.

FIELDS_NUM—An integer specifying the initial number of fields in the form. Defaults to the number of specified fields.

DATA_TYPE—An integer, specified by the clients, that indicates what is the type of the data. Used mainly in defining primitive classes. It does not have default value.

DATA_SIZE—The size of the forms data portion. Used mainly in defining primitive classes. It does not have default value.

FIELDS—Indicates the beginning of the class's fields definitions.

The field attributes that can be specified are:

The class field name.

FIELD_CLASS_ID—The class id for the forms to reside in the field. Note that the class name can be used for the same purpose.

FIELD_CLASS_NAME—The class name for the forms to reside in the field.

Here is an example of the definition of three classes:

Note that variable length forms contains fields of a single class. "integer" and "string_30", used in the above examples, are two primitive classes that are defined within the Formclass package itself.

5.7 Form Classes are Forms

Form classes are implemented as forms. This means functions that accept forms as an argument also accept form classes. Some of the more useful functions on form classes are:

Form_pack, Form_unpack—Can be used to pack and unpack form classes.

Form_copy—Can be used to copy form classes.

Form_show—Can be used to print form classes.

5.8 Types typedef Formclass
A form-class handle.
typedef Formclass_id
A form-class identifier.
typedef Formclass_attr
A form-class attribute type. Supported attributes are:
FORMCLASS_SIZE—The size of the class form instances.
FORMCLASS_NAME—The class name.
FORMCLASS_ID—A two byte long unique identifier.
FORMCLASS_FIELDS_NUM—The number of (direct) fields in the class. This is applicable only for fixed length classes. The number of fields in a variable length class is different for each instance; hence, is kept in each form instance.
FORMCLASS_INSTANCES_NUM—The number of form instances of the given class.
FORMCLASS_IS_FIXED—True if its a fixed length form, False if its a variable length form.
FORMCLASS_IS_PRIMITIVE—True if its a form of primitive type, False if its a constructed form, i.e. the form has sub forms.
FORMCLASS_DATA_TYPE—This field value is assigned by the user of the forms a to identify the data type of primitive forms. In our current application we use the types constants as defined by the enumerated type Form_data_type, in the file forms.h.
FORMCLASS_DATA_SIZE—This field contains the data size, in bytes, of primitive forms. For instance, the data size of the primitive class Short is two. Because it contains the C type short, which is kept in two bytes.
typedef Formclass_field_attr
A form-class field attribute type. Supported form class field attributes are:
FORMCLASS_FIELD_NAME—The name of the class field.
FORMCLASS_FIELD_CLASS_ID—The class id of the field's form.
typedef Form
A form handle.
typedef Form_field_id
An identifier for a form's field. It can identifies fields in any level of a form. A field identifier can be retrieved form a field name, using the function Form-class_get_field_name. A form_field_id is manipulated by the functions: Form_field_id_first and Form_field_id_next.
typedef Form_attr
A form attribute type. Supported form attributes are:
FORM_CLASS_ID—The form's class identifier.
FORM_DATA_SIZE—The size of the form's data. Available only for constructed, not primitive, forms or for primitive forms that are of variable size. For fixed length primitive forms this attribute is available via the form class.
FORM_FIELDS_NUM—The number of fields in the given form. Available only for constructed, not primitive forms. For primitive forms this attribute is available via the form class.
typedef Form_data
The type of the data that is kept in primitive forms.
typedef Form_pack_format
Describes the possible form packing types. Supported packing formats are:
FORM_PACK_LIGHT—Light packing, used mainly for inter process communication between processes on the same machine. It is more efficient then other types of packing. Light packing consists of serializing the given form, but it does not translates the form data into machine independent format.
FORM_PACK_XDR—Serialize the form while translating the data into a machine-independent format. The machine-independent format used is Sun's XDR.

5.9 Procedural Interface to the Forms-class Package

The formclass package is responsible for creating and manipulating forms classes. The forms package uses these descriptions to create and manipulate instances of given form classes. An instance of a form class is called, not surprisingly, a form.

Formclass_create

Create a class handle according to the given argument list. If the attribute CLASS_CFILE is specified it should be followed by a cfile handle and a path_name. In that case formclass_create locates the specification for the form class in the specified configuration file. The specification is compiled into an internal data structure for use by the forms package.

Formclass_create returns a pointer to the class data structure. If there are syntax errors in the class description file the function sets the error message flag and returns NULL.

Formclass_destroy

The class description specified by the given class handle is dismantled and the storage is reclaimed. If there are live instances of the class then the class is not destroyed and the error value is updated to "FORMCLASS_ERR_NON_ZERO_INSTANCES_NUM".

Formclass_get

Given a handle to a form class and an attribute of a class (e.g. one of the attributes of the type Formclass_attr) Formclass_get returns the value of the attribute. Given an unknown attribute the error value is updated to "FORMCLASS_ERR_UNKNOWN_ATTRIBUTE".

Formclass_get_handle_by_id

Given a forms-class id, Formclass_get_handle_by_id returns the handle to the appropriate class descriptor. If the requested class id is not known Formclass_get_handle_by_id returns NULL, but does not set the error flag.

Formclass_get_handle_by_name

Given a forms-class name, Formclass_get_handle_by_name returns the handle to the appropriate class descriptor. If the requested class name is not known Formclass_get_handle_by_name returns NULL, but does not set the error flag.

Formclass_get_field_id

Given a handle to a form class and a field name this function returns the form id, which is used for a fast access to the form. If the given field name does not exist, it updated the error variable to FORMCLASS_ERR_UNKNOWN_FIELD_NAME.

Formclass_field_get

Returns the value of the requested field's attribute. If an illegal id is given this procedure, it updated the error variable to FORMCLASS_ERR_UNKNOWN_FIELD_ID.

Formclass_iserr

Returns TRUE if Formclass error flag is turned on, FALSE otherwise.

Formclass_errno

Returns the formclass error number. If no error, it returns FORMCLASS_OK. For a list of supported error values see the file formclass.h.

5.10 The Forms Package

Form_create

Generate a form (i.e., an instance) of the form class specified by the parameter and return a handle to the created form.

Form_destroy

The specified form is "destroyed" by reclaiming its storage.

Form_get

Given a handle to a form and a valid attribute (e.g. one of the values of the enumerated type Form_attr) Form_get returns the value of the requested attribute.

The attribute FORM_DATA_SIZE is supported only for variable size forms. For fixed size form this information is kept in the class description and is not kept with each form instance. Requiring the FORM_DATA_SIZE from a fixed length form will set the error flag to FORM_ERR_NO_SIZE_ATTR_FOR_FIXED_LENGTH_FORM.

The attribute FORM_FIELDS_NUM is supported only for constructed forms. Requiring the FORM_FIELDS_NUM from a primitive form will set the error flag to FORM_ERR_ILLEGAL_ATTR_FOR_PRIMITIVE_FORM.

If the given attribute is not known the error flag is set to FORM_ERR_UNKNOWN_ATTR. When the error flag is set differently, then FORM_OK Form_get returns NULL.

Form_set_data

Sets the form's data value to the given value. The given data argument is assumed to be a pointer to the data, e.g., a pointer to an integer or a pointer to a date structure. However for strings we expect a pointer to a character.

Note that we use Copy semantics for assignments.

Form_get_data

Return a pointer to form's data portion. In case of a form of a primitive class the data is the an actual value of the form's type. If the form is not of a primitive class, i.e., it has a non zero number of fields, then the form's value is a handle to the form's sequence of fields.

Warning, the returned handle points to the form's data structure and should not be altered. If the returned value is to be modified is should be copied to a private memory.

Form_set_data_pointer

Given a variable size form, Form_set_data_pointer assigns the given pointer to the points to the forms data portion. Form_set_data_pointer provide a copy operation with pointer semantics, as opposed to copy semantics.

If the given form is a fixed length form then the error flag is set to FORM_ERR_CANT_ASSIGN_POINTER_TO_FIXED_FORM.

Form_field_set_data

This is a convenient routine that is equal to calling Form_field_get and then using the retrieved form to call Form_set_data. More precisely: form_field_set_data(form, field_id, form_data, size)==form_set_data(form_field_get(form, field_id), form_data, size), plus some error checking.

Form_field_get_data

Note that we use Copy semantics for assignments.

This is a convenient routine that is equal to calling Form_field_get and then using the retrieved form to call Form_get_data. More precisely: form_field_get_data(form, field_id, form_data, size)== form_get_data(form_field_get(form, field_id), form_data, size) plus some error checking.

Warning, the returned handle points to the form's data structure and should not be altered. If the returned value is to be modified is should be copied to a private memory.

form_field_id_first

Form_field_id_first sets the given field_id to identify the first direct field of the given form handle.

Note that the memory for the given field_id should be allocated (and freed) by the clients of the forms package and not by the forms package.

form_field_id_next

Form_field_id_first sets the given field_id to identify the next direct field of the given form handle. Calls to Form_field_id_next must be preceded with a call to Form_field_id_first.

Note that the memory for the given field_id should be allocated (and freed) by the clients of the forms package and not by the forms package.

Form_field_set

Sets the given form or form sequence as the given form field value. Note that we use Copy semantics for assignments.

When a nonexistent field id is given then the error flag is set to FORM_ERR_ILLEGAL_ID.

Form_field_get

Return's a handle to the value of the requested field. The returned value is either a handle to a form or to a form sequence.

Warning, the returned handle points to the form, data structure and should not be altered. If the returned value is to be modified is should be copied to a private memory, using the Form_copy function.

When a nonexistent field id is given, then the error flag is set to FORM_ERR_ILLEGAL_ID and Form_field_get returns NULL.

Form_field_append

Form_field_append appends the given, append_form argument to the end of the base_form form sequence. Form_field_append returns the id of the appended new field.

Form_field_delete

Form_field_delete deletes the given field from the given base_form.

If a non existing field id is given then the error flag is set to FORM_ERR_ILLEGAL_ID and Form_field delete returns NULL.

Form_pack

Form_pack returns a pointer to a byte stream that contains the packed form, packed according to the requested format and type.

If the required packed type is FORM_PACK_LIGHT then Form_pack serializes the form, but the forms data is not translated to a machine-independent representation. Hence a lightly packaged form is suitable to transmit between processes on the same machine.

If the required packed type is FORM_PACK_XDR then Form_pack serializes the form and also translates the form representation to a machine-independent representation, which is Sun's XDR. Hence form packed by an XDR format are suitable for transmitting on a network across machine boundaries.

Formclass.h. are implemented as forms, hence Form_pack can be used to pack form classes as well as forms.

Form_unpack

Given an external representation of the form, create a form instance according to the given class and unpack the external representation into the instance.

Form classes are implemented as forms, hence Form_unpack can be used to unpack form classes as well as forms.

Form_copy

Copy the values of the source form into the destination form. If the forms are of different classes no copying is performed and the error value is updated to FORM_ERR_ILLEGAL_CLASS.

Formclasses are implemented as forms, hence Form_copy can be used to copy form classes as well as forms.

Form_show

Return an ASCII string containing the list of field names and associated values for indicated fields. The string is suitable for displaying on a terminal or printing (e.g., it will contain new-line characters). The returned string is allocated by the function and need to be freed by the user. (This is function is very useful in debugging.)

Formclasses are implemented as forms, hence Form_show can be used to print form classes as well as forms.

Form_iserr

Returns TRUE if the error flag is set, FALSE otherwise.

Form_errno

Returns the formclass error number. If no error, it returns FORMCLASS_OK. The possible error values are defined in the file forms.h.

GLOSSARY

There follows a list of definitions of some of the words and phrases used to describe the invention.

Format or Type: The data representation and data organization of a structural data record, i.e., form.

Foreign: A computer or software process which uses a different format of data record than the format data record of another computer or software process.

Form: A data record or data object which is self-describing in its structure by virtue of inclusion of fields containing class descriptor numbers which correspond to class descriptors, or class definitions. These class descriptors describe a class of form the instances of which all have the same internal representation, the same organization and the same semantic information. This means that all instances, i.e., occurrences, of forms of this class have the same number of fields of the same name and the data in corresponding fields have the same representation and each corresponding field means the same thing. Forms can be either primitive or constructed. A form is primitive if it stores only a single unit of data. A form is constructed if it has multiple internal components called fields. Each field is itself a form which may be either primitive or constructed. Each field may store data or the class_id, i.e., the class number, of another form.

Class/Class Descriptor/Class Definition: A definition of the structure and organization of a particular group of data records or "forms" all of which have the same internal representation, the same organization and the same semantic information. A class descriptor is a data record or "object" in memory that stores the data which defines all these parameters of the class definition. The Class is the name of the group of forms and the Class Definition is the information about the group's common characteristics. Classes can be either primitive or constructed. A primitive class contains a class name that uniquely identifies the class (this name has associated with it a class number or class_id) and a specification of the representation of a single data value. The specification of the representation uses well known primitives that the host computer and client applications understand such as string_20 ASCII, floating point, integer, string_20 EBCDIC etc. A constructed class definition includes a unique name and defines by name and content multiple fields that are found in this kind of form. The class definition specifies the organization and semantics or the form by specifying field names. The field names give meaning to the fields. Each field is specified by giving a field name and the form class of its data since each field is itself a form. A field can be a list of forms of the same class instead of a single form. A constructed class definition contains no actual data although a class descriptor does in the form of data that defines the organization and semantics of this kind of form. All actual data that define instances of forms is stored in forms of primitive classes and the type of data stored in primitive classes is specified in the class definition of the primitive class. For example, the primitive class named "Age" has one field of type integer_3 which is defined in the class definition for the age class of forms. Instances of forms of this class contain 3 digit integer values.

Field: One component in an instance of a form which may have one or more components, each named differently and each meaning a different thing. Fields are "primitive" if they contain actual data and are "constructed" if they contain other forms, i.e., groupings of other fields. A data record or form which has at least one field which contains another form is said to be "nested". The second form recorded in the constructed field of a first form has its own fields which may also be primitive or constructed. Thus, infinitely complex layers of nesting may occur.

Process: An instance of a software program or module in execution on a computer.

Semantic Information: With respect to forms, the names and meanings of the various fields in a form.

Nested: A data structure comprised of data records having multiple fields each of which may contain other data records themselves containing multiple fields.

Primitive Field: A field of a form or data record which stores actual data.

Constructed Field: A field which contains another form or data record.

Format Operation: An operation to convert a form from one format to another format.

Semantic-Dependent Operation: An operation requiring access to at least the semantic information of the class definition for a particular form to supply data from that form to some requesting process.

Application: A software program that runs on a computer other than the operating system programs.

Decoupling: Freeing a process, software module or application from the need to know the communication protocols, data formats and locations of all other processes, computers and networks with which data is to be interchanged.

Class: A definition of a group of forms wherein all forms in the class have the same format and the same semantics.

Interface: A library of software programs or modules which can be invoked by an application or another module of the interface which provide support functions for carrying out some task. In the case of the invention at hand, the communication interface provides a library of programs which implement the desired decoupling between foreign processes and computers to allow simplified programming of applications for exchanging data with foreign processes and computers.

Subscribe Request: A request for data regarding a particular subject which does not specify the source server or servers, process or processes or the location of same from which the data regarding this subject may be obtained.

Service Record: A record containing fields describing the important characteristics of an application providing the specified service.

Server Process: An application process that exports the functions or data supplied by a particular service, such as Telerate, Dow Jones News Service, etc.

Service Discipline or Service Protocol: The protocol for communication with a particular server process, application, local area network.

Client Application: An application linked to the libraries of the communication interface according to the teachings of the invention or otherwise linked to a service.

Transport Layer: A layer of the standard ISO model for networks between computers to which the communication interface of the invention is linked.

Transport-layer Protocol: The particular communication protocol or discipline implemented on a particular network.

Service: A meaningful set of functions or data which an application can export for use by client applications. In other words, a service is a general class of applications which do a particular thing, e.g., applications supplying Dow Jones News information.

Service Instance: A process running on a particular computer and which is capable of providing the specified service (also sometimes called a server process).

Server: A computer running a particular process to do something such as supply files stored in bulk storage or raw data from an information source such as Telerate to a network or another computer/workstation for distribution to other processes coupled to the server.

Subject Space: A hierarchical set of subject categories.

Subject Domain: A set of subject categories (see also subject space).

Class Definition: The specification of a form class.

Class Descriptor: A memory object which stores the formclass definition. In the class manager, it is stored as a form. On disk, it is stored as an ASCII string. Basically, it is a particular representation or format for a class definition. It can be an ASCII file or a form type of representation. When the class manager does not have a class descriptor it needs, it asks the foreign application that created the class definition for the class descriptor. It then receives a class descriptor in the format of a form as generated by the foreign application. Alternatively, the class manager searches a file or files identified to it by the application requesting the semantic-dependent operation or identified in records maintained by the class manager. The class definitions stored in these files are in ASCII text format. The class manager then converts the ASCII text so found to a class descriptor in the format of a native form by parsing the ASCII text into the various field names and specifications for the contents of each field.

Native Format/Form: The format of a form or the form structure native to an application and its host computer.

ID: A unique identifier for a form, record, class, memory object etc. The class numbers assigned the classes in this patent specification are examples of ID's.

Handle: A pointer to an object, record, file, class descriptor, form etc. This pointer essentially defines an access path to the object. Absolute, relative and offset addresses are examples of handles.

Class Data Structure: All the data stored in a class manager regarding a particular class. The class descriptor is the most important part of this data structure, but there may be more information also.

Configuration File: A file that stores data that describes the properties and attributes or parameters of the various software components, records and forms in use.

Attribute of a Form Class: A property of form class such as whether the class is primitive or constructed. Size is another attribute.

A software appendix, which is a preferred embodiment according to the teachings of the invention as described herein, is available in the application file in the U.S. Patent and Trademark Office. This material is covered by copyright, but fair use of the appendix material for purposes of understanding the invention is permitted.

What is claimed is:

1. An apparatus for facilitating data exchange between one or more data consuming and data publishing processes running on one or more computers coupled by any data exchange medium, comprising:
   - a first software layer for execution on said one or more computers and coupled to all said processes for implementing data distribution decoupling between said processes such that no data consuming process need include any software routine to determine the address of any particular process which is publishing data desired by said data consuming process, but may simply request desired data by subject and said subject will then be automatically mapped to the appropriate one or more data publishing processes publishing data on that subject and the appropriate one or more communication protocols necessary to communicate with said data publishing processes;
   - a second software layer for execution on said one or more computers and coupled to all said processes and to said first software layer for implementing service protocol decoupling between said processes such that no data consuming or data publishing process need include any software routine to implement a communication protocol necessary to communicate with any other data consuming or data publishing process, all said communication protocols being encoded in service discipline programs forming part of said second software layer, said second software layer including means for receiving information from said first software layer regarding the subject upon which data is requested, and including one or more software routines for establishing communication through said data exchange medium such that only data on said requested subject is received by said data consuming process which requested data on said subject; and
   - a third software layer coupled to all said processes and to said second software layer for implementing data format decoupling between said processes such that processes communicating with each other need not include software routines to translate between differing data representation formats and data record organizations used in data objects being exchanged by said communicating processes, all necessary translation from the data representation used by a data publishing process to a data representation used by the data consuming process which requested data on the subject being carried out by said third software layer.

2. The apparatus of claim 1 further comprising communication layer software coupled to said second software layer for providing reliable communications between said processes such that no data consuming or data producing process need include any software routine to perform reliable communications between processes, and wherein said third software layer includes means for receiving requests to retrieve data from a particular named field of data from a data record published by a data publishing process and for determining the location of said field within said data record and retrieving the data from said field and returning it to the process which requested it.

3. An apparatus for coupling data between processes running in a computing environment having
   - a first central processing unit;
   - a second central processing unit;
   - one or more application processes which are data consumers running on said first and/or second central processing units and having at least one software routine to generate a subscription request for data on a particular subject;
   - one or more service processes running on one or more of said first and/or second central processing units, each having an access protocol and each supplying data on a particular subject or group of subjects;
   - one or more data exchange media such as shared memory, and/or shared distributed memory, and/or local area networks and/or wide area networks coupling said first and second central processing units together, each data exchange media having a communication protocol, said apparatus for coupling data comprising:
   - one or more subject-based addressing programs coupled at least to said application processes for execution on said first and/or second central processing units for receiving subscription requests from said application processes, each subscription request requesting data on a particular subject and including means for mapping the subject of each said subscription request to the network address and/or identity of one or more of said service processes which supply data on said subject, and for generating a request that at least one communication link per subscription request to the appropriate service process be established on each said subject with one or more of said service processes which provides data on said subject;
   - one or more service discipline programs for execution on said first and/or second central processing units which receive said one or more requests to establish a communication link on each said subject, for sending a request to one or more of said service process or processes using the access protocols for traversing the appropriate data exchange media to establish a communication link and for communicating with the selected service process or processes so as to establish a subscription for data on each said subject with the appropriate service process or processes, said service discipline programs for continuing to assist in passing data on each said subject to the appropriate application process that originated the subscription request until said subscription request on said subject cancelled.

4. The apparatus of claim 3 wherein said subject-based addressing programs are also coupled to each service process and include software routines which maintain records of all active subscription subjects and which support subject-based addressing by filtering data messages to be transmitted over said data exchange media by subject such that data on subjects for which there are no active subscriptions is never transmitted on said media thereby conserving computing resources, and wherein said application processes include software routines to generate cancel requests naming a subject for which a subscription is to be cancelled when data on that particular subject are no longer desired by the data consuming process which issued the subscription request, and wherein said subject-based addressing programs include routines to compare the subject of each said cancel request to the list of active subscriptions and, if a match is found, to send a cancel request to the appropriate one or more service discipline programs managing communication links on that particular subject, and wherein said service discipline programs include routines to send one or more cancel requests to all service processes which are currently supplying data on a particular subject for which the subscription was cancelled.

5. The apparatus of claim 4 wherein said mapping means includes means for sending each said subscription request and the subject thereof to a directory services program which maintains service records matching subjects to the addresses of service processes which supply data on said subjects, and wherein said directory services program includes a routine to compare the subject in each said subscription request to the subjects in said service records and to pass all service records for which there is a subject match back to said means for mapping, and wherein said means for mapping includes a routine to invoke all the service discipline programs identified by said service records passed back from said directory services program so as to set up communication links on the pertinent subject with all the service processes identified in said service records.

6. The apparatus of claim 5 wherein said service record for each said service process includes data identifying the address where said service process can be accessed through said data exchange media and the appropriate service discipline program used to communicate with said service process.

7. The apparatus of claim 6 wherein said service records also include data identifying the central processing unit upon which each service process is in execution and the address on said data exchange media of said central processing unit.

8. The apparatus of claim 3 wherein any service discipline program which has established an active subscription communication link with a service process which is broadcasting data on more subjects than just the subject of said active subscription includes a software routine to filter out data not pertinent to the subject of said active subscription and pass the remaining data to the subscribing application process.

9. The apparatus of claim 8 wherein said communication daemons include programs and/or software subroutines to provide low-level system support by filtering data messages to be transmitted via said data exchange media by subject.

10. The apparatus of claim 3 wherein said subject-based addressing programs include a directory services program which maintains service records which contain information on each said service process indicating which subjects on which each service process can supply data, and the address of each said service process, and the particular service discipline program encapsulating an appropriate communication protocol to access said service process, said means for mapping including means for invoking said directory services program and passing to it the subject of said subscription request, said directory services program including means for comparing the subject of said subscription request to the subjects listed in said service records and for returning all said service records for which there is a subject match to said subject based addressing program which received the subscription request, said subject based addressing program including means for examining said service record or records and identifying the appropriate one or more service discipline programs that are capable of communicating with the service processes identified in said service records and for passing said service records to the selected service discipline program or programs with said request to establish said communication link to aid said service discipline program or programs in establishing one or more subscription communication links on the requested subject.

11. The apparatus of claim 3 further comprising one or more failure recovery programs for switching between service processes supplying data on the same subject, or switching between available alternative paths if any through the networks or one or more data exchange media coupling an application process which requested data on a subject to a service process supplying data on that subject upon failure to receive the requested data so as to maintain the flow of data on the subject if possible.

12. The apparatus of claim 3 wherein each service process is coupled to said one or more data exchange media through a communications daemon which includes routines to filter data output by said service process in accordance with active subscriptions such that only data pertaining to the subject or subjects of one or more active subscriptions are transmitted over said data exchange media to service discipline programs managing one or more active subscription communication links.

13. The apparatus of claim 3 wherein said one or more subject-based addressing programs and said one or more service discipline programs together comprise a communication library of programs, and wherein each said application process and each said service process is linked to its own copy of said communication library programs, and further comprising a communication daemon coupling each said central processing unit to said one or more data exchange media, each daemon comprising one or more protocol engine programs linking said communication library or libraries to said one or more data exchange media, each said protocol engine implementing a communication protocol to interface a service discipline program to said data exchange media, each said protocol engine linked to an application process with an active subscription for cooperating with another protocol engine linked to a service process supplying the requested data to ensure reliable communication of data on the requested subject over said data exchange media.

14. The apparatus of claim 3 wherein at least some of said data exchange media have transport layer protocols and wherein said one or more subject-based addressing programs and said one or more service discipline programs together comprise a communication library of programs, and wherein each said application process and each said service process is linked to its own copy of said communication library programs, and further comprising one or more communication daemons, each coupling one of said central processing units to said data exchange media, and each daemon comprising one or more protocol engine programs, each said protocol engine encapsulating a communication protocol suitable for communication over at least one of said data exchange media, said protocol engines for cooperating with each other and with said transport layer protocols of said data exchange media to ensure reliable communications of data between application processes and/or said service processes, and further comprising one or more data exchange components linked to said application and service processes, each data exchange component comprised of a library of programs for execution on said first and/or second central processing units for managing data exchange between application processes and service processes in execution on either of said central processing units which use different data record formats and/or data representations by automatically performing data format conversion services such that an application process can request and receive data on a subject from a service process in a format and/or data representation which is useable by the requesting process and for freeing the requesting process of the need to convert said data request into a data format used by said server process such that the formalities of data format conversion necessary for effective data communication between application and service processes is transparent to these processes in that neither application or service processes communicating with each other need contain software routines capable of performing said data format conversions.

15. In a computing environment having a first computer, a second computer, one or more data consuming application processes executing on said first and/or second computers for requesting and using data on a subject specified in a subscription request, and one or more service processes executing on said first or second computers, each capable of supplying data on particular subjects, and one or more data exchange media coupling said data consuming process to said service process, an apparatus for facilitating data exchange between said data consuming process and said service process, comprising:

one or more service discipline programs which encode communication protocols to communicate with particular ones of said service processes, each for receiving a request to establish communications on a particular subject and for establishing communications with a service process so as to receive data from said service process and pass only data on the requested subject to said data consuming process which issued said subscription request;

a subject based addressing program for receiving a subscription request on a particular subject and for mapping the subject to a particular service discipline and for issuing a request to establish communications on the requested subject to said service discipline.

16. An apparatus for assisting in the communication of data between computer processes in a computer network having one or more host CPU's or workstations and/or servers coupled together by a data communication structure comprising one or more local area networks and/or wide area networks and/or shared local or distributed memory, each said host CPU, server and workstation running software processes some of which are publisher processes which publish data, some of which are subscriber processes which consume data and some of which may do both, said publication of data carried out by sending data over said communication structure, comprising:

a library of communication programs a copy of which is linked to every software process, for receiving subscription requests from data consuming processes requesting data on particular subjects, and for mapping each of said subjects to an appropriate communication program which is capable of establishing communications with a publisher process which supplies data on the requested subjects, and for invoking said appropriate communication program for each said subject in said communication library to establish and maintain a communication link with at least one of said publisher processes supplying data on said subject, said communication program encapsulating all of the software communication protocols needed to access said publisher process and to provide a programmatic interface by which subscription requests to said communication library are entered by said subscriber processes; and one or more libraries of data format decoupling programs a copy of which is linked to each said communication library and to each said software process for performing data format translation services for publisher and subscriber processes between which data exchange takes place such that any subscriber process may receive data in a format useable by said subscriber process even though the publisher process from which the data originated may use a different data record format or data representation, and for providing semantic data retrieval services whereby subscriber processes may extract desired data from specific fields of specific data records from a publisher process despite the fact that the specified data record from which data is to be retrieved may have a different data record organizations without the need for any software routines in the subscriber process or the publisher process to process or translate differences in the organization of data records or differences in the field names in said data records.

17. The apparatus of claim 16 wherein each said library of programs for data format decoupling includes one or more forms-manager programs for manipulating instances of self-describing data records each of which contains both actual data and format data, said format data being defined in one or more form class definitions, said form class definition defining the names and formats or data representation type of each field of data records in the class of data records corresponding to said form class definition and defining the organization of said fields within each instance of a data record of that class, and further includes one or more forms-class manager programs coupled to said forms-manager program or programs for manipulation of said form class definitions including a program for receiving a get-field call from a subscriber or data publishing process or from a program in said library of communication programs, said get-field call including the address of a particular data record and the name of a field therein, and for retrieving the form class definition of the class of the data record of interest and searching said form class definition for a field having the same name or a synonym of the name of the field name given in said get-field call, and for returning a relative offset pointer to the calling program, and including a program for receiving a get-data call from a subscriber or data publishing process or from a program in said library of communication programs including the relative address pointer for the location of the desired data field in the desired data record identified by said get-field call and for extracting the data in in the field of the desired data record as identified by said relative address pointer and returning said data to the calling program, and including one or more format conversion programs for converting data records to be sent to a subscribing process from the data record format of the transmitting process to a data record format necessary for transmission over said communication structure, and, upon arrival at the receiving host CPU or workstation or server, for converting the data record format from the data record format used for transmission over said communication structure to the data record format used by the receiving process.

18. An apparatus for facilitating communication of data between two or more software processes in execution on the same or different computers coupled by a data exchange medium where no process needs to know the port address of any other process, comprising:

one or more computers;

a network comprised of at least one data transfer path, said network coupling said one or more computers by one or more data transfer paths;

at least one application process in execution on at least one of said computers and capable of requesting data by subject;

at least one data publishing process which may or may not be the same as said application process, said data publishing process in execution on at least one said computer and capable of outputting data on at least one subject;

a subject based addressing program including means for obtaining data on different subjects, said subject based addressing program including computer programs linked at least to each of said at least one application and data publishing processes and to said network for receiving and processing subscription requests from said at least one application process on at least one subject and for mapping said subject to an appropriate means for obtaining data on the requested subject, and for entering a subscription for data on the requested subject with said appropriate means for obtaining data on said subject, and for receiving data on the requested subject and passing the data to the appropriate said one or more application processes which requested the data.

19. The apparatus of claim 18 wherein said subject based addressing program further comprises means for issuing a command to establish a subscription communication session on said subject with one or more of said data publishing processes capable of supplying data on the requested subject, and wherein said means for obtaining data on different subjects includes a service discipline program for encapsulating a protocol for obtaining data on the subject, and for receiving said command to establish a subscription communication session on said subject, and for establishing a subscription communication session with one or more of said data publishing processes, and entering a subscription request to said one or more data publishing processes to supply data on said subject, and for receiving data on said subject and passing said data to said one or more application processes which requested data on said subject.

20. The apparatus of claim 19 wherein said one or more computers comprises at least two server computers, and wherein said at least one data publishing process comprises at least two service instances in execution on at least two of said server computers, and wherein at least two of said service instances and/or server computers require different communication protocols to communicate therewith, and wherein said service discipline program encapsulates at least two different service discipline protocols for communicating with said at least two different service instances, and wherein said subject based addressing program includes means for mapping said subject to one or more of said service discipline protocols, and further includes means for issuing a subscription request so as to cause the appropriate service discipline protocol to execute and set up a communication session so as to obtain data on said subject, each said service discipline protocol including means for passing data received on said subject to the one or more application processes which requested data on said subject.

21. The apparatus of claim 20 wherein at least some of said service discipline protocols have different fault tolerance characteristics.

22. The apparatus of claim 21 wherein said network comprises at least two networks each of which is coupled to at least some of said application and data producing processes and wherein said service discipline protocols have different fault tolerance characteristics which comprise at least automatic switchover to a different service instance capable of supplying data on the same subject upon failure of a service instance from which data is being received via a subscription, and automatic switchover to an alternate network coupled to a data producing process capable of supplying data on the same subject upon failure of the data path in use.

23. The apparatus of claim 22 wherein said different fault tolerance characteristics comprise at least automatic switchover to a different server computer having in execution thereon a service instance capable of supplying data on the requested subject upon failure of either the server computer or the service instance from which data is being received.

24. The apparatus of claim 19 wherein said one or more computers includes at least two server computers each of which has running thereon a data publishing process or service instance, at least two of said server computers and the service instances in execution thereon requiring different communication protocols to communicate therewith, and wherein said service discipline program includes means for encapsulating at least two different service discipline protocols, each for communicating with at least one of said different data publishing processes or service instances in execution on said server computers, and wherein said subject based addressing program includes means for mapping said subject to the appropriate said service discipline protocol, and for invoking said service discipline protocol so as to establish a communication session on the requested subject and, for passing data received on said subject to the appropriate one or more application processes which requested data on said subject, and further comprising at least two said networks, and means coupled to said at least two networks and to said at least one application process and said at least one data publishing process or service instance for providing network failure fault tolerance by automatically switching to an alternate network upon failure of the data transfer path being used to transfer data on said subject.

25. The apparatus of claim 24 wherein said service discipline program includes means for monitoring the continued viability of at least one said service instance as a source of data on the requested subject with which a communication session has been established, and, upon failure of the service instance to supply data on the requested subject, for automatically selecting another server computer upon which another service instance is in execution which is capable of supplying data on the requested subject, and for establishing a communication session therewith by invoking an appropriate service discipline protocol and establishing a subscription with said service instance to supply data on the requested subject, and for passing the resulting data on the requested subject to the one or more application processes which requested said data.

26. The apparatus of claim 20 or 24 wherein said service discipline program includes means for monitoring the continued viability of one or more of said server computers as a source of data on the requested subject, and, upon failure of the monitored server computer supplying data on the requested subject, for automatically selecting another server computer upon which a service instance is in execution which is capable of supplying data on said subject, and for establishing a communication session therewith on said subject by invoking an appropriate service discipline protocol, and for passing the resulting data on the requested subject to the one or more application processes which requested said data.

27. The apparatus of claim 19 wherein said one or more computers comprises at least two server computers, and wherein said at least one data publishing process comprises at least two service instances in execution on at least two of said server computers and wherein at least two of said service instances and/or server computers require different communication protocols to communicate therewith, and wherein said service discipline program includes means for encapsulating at least two different service discipline protocols for communicating with said at least two different service instances which require different protocol to communicate therewith, and wherein said subject based addressing program includes means to invoke the appropriate service discipline protocol to obtain data on a particular subject, each said service discipline program including means for passing data received on said subject to the one or more application processes which requested data on the subject, and further comprising communication means coupled at least to said service discipline program and comprising at least one protocol engine for encapsulating a network communication protocol for establishing communications over said network by interfacing said service discipline protocol to said network using the communication protocol native to said network.

28. The apparatus of claim 27 wherein said communication means comprises a plurality of protocol engines, each of which may encapsulate a different network communication protocol, each of said protocol engines being able to interface one or more of said service discipline protocols to said network using the network communication protocol encapsulated in said protocol engine.

29. The apparatus of claim 28 wherein at least some of said service discipline protocols have different fault tolerance characteristics such as automatic switchover to a different server computer supplying data on the same subject upon failure of a server computer from which data is being received via a subscription or automatic switchover to an alternate network to reach the same server computer or another server computer supplying data on the same subject upon failure of the data path currently being used to obtain data on said subject.

30. The apparatus of claim 28 wherein at least some of said protocol engines have different fault tolerance characteristics such as reliable broadcast communication protocols for verifying that all message packets of a broadcast have been successfully received and requiring rebroadcast of any lost or garbled message packets, or automatic switchover to an alternate network upon failure of the data path currently being used.

31. The apparatus of claim 19 wherein said service discipline program is coupled to a data publishing process supplying data on said subject, and supports subject based addressing by filtering data by subject so as to conserve network bandwidth.

32. The apparatus of claim 18 further comprising a data format decoupling program comprised of one or more computer programs coupled to each of said one or more application processes and to each of said one or more data publishing processes, for facilitating the transfer of data via said network between said data publishing process and said application process using self-describing data objects or forms by performing format conversion operations where the formats for the expression and organization of data records used by each computer data publishing process or application process may be different, and where said self-describing data objects each contain one or more fields and are organized into one or more classes each of which has a unique class identification, said data format decoupling program including one or more computer programs to define the general organization of each class of self-describing data objects in terms of the semantic information or names of each field and the format information defining the class identification or code used to express the data contained in each field in a class definition, and wherein the actual data to be transferred and said format information is stored in each instance of a self-describing data object, and wherein said data format decoupling means includes at least one forms manager program means for converting the data format of data on a subject requested by an application process from the data format in which said data is published by said data publishing process to a format suitable for transfer via said network and, upon receipt from said network, for converting said data from the format used for transfer over said network to a format used by said application process, and for performing one or more of said format conversion operations using format information stored in the instance of the form itself or in said class definition.

33. The apparatus of claim 32 further comprising a data format decoupling library comprised of one or more computer programs linked at least to each said one or more application processes and said one or more data publishing processes, including at least one class manager means for performing semantic-dependent operations to facilitate the exchange of self-describing data objects called forms between said at least one application process which uses data in a first format and said at least one data publishing process which may publish data in a second format different from said first format, said forms each being comprised of one or more fields each of which contains another form which may be either a primitive class form in that said field contains data or a constructed class form, said constructed class form containing one or more fields each of which may be a primitive class form or another constructed class form, such that form classes may be nested to any number of nesting levels, said class manager means also for facilitating the exchange of data by receiving a request to get the data from a particular field of a particular instance of a form and for searching a class definition for a field having a name matching the field named in said request, said searching including searching of all class definitions for any fields of said class definition containing constructed class forms and including searching through all levels of nesting of said class definitions, and for returning to the requesting process a relative address pointer identifying the location of the requested field within instances of the form of the class of forms containing the requested field, and further for receiving a request for the particular data contained in said field named in the original request and for using said relative address pointer and the address of the particular instance of the form to read the requested data and return said data to said requesting process.

34. The apparatus of claim 18 further comprising a data format decoupling library comprised of one or more computer programs linked at least to each said one or more application processes and to said one or more data publishing processes, including at least one class manager means for performing semantic-dependent operations to facilitate the exchange of self-describing data objects called forms between said at least one application process which uses data in a first format and said at least one data publishing process which outputs data in a second format which may be different from said first format, said forms each being comprised of one or more fields each of which contains another form which may be either a primitive class form in that said field contains data or a constructed class form, said constructed class form containing one or more fields each which may be a primitive class form or another constructed class form, such that form classes may be nested to any number of nesting levels, said class manager means further for facilitating the exchange of data by receiving a request to get data from a particular named field of a particular instance of a form, and for searching a class definition for a field having a name matching the field named in said request, said searching including searching of all class definitions for any fields in the class definition containing constructed class forms, and including searching through all levels of nesting of said class definitions, and for returning a relative address pointer to the requesting process identifying the location of the requested field within instances of the form of the class of forms containing the requested field, and further for receiving a request for the particular data contained in said field named in the original request and using said relative address pointer and the address of a particular instance of said form to read the requested data and return said data to said requesting process.

35. The apparatus of claim 18 or 32 or 34 further comprising at least two said networks coupling at least some of said one or more computers, and wherein said one or more computers includes at least two server computers upon which at least two data publishing processes or service instances are in execution publishing data on said subject upon which data has been requested and further comprising means coupled to said at least one application process and to said at least two service instances and to said at least two networks for providing network failure and service instance failure fault tolerance by automatically switching to an alternate network upon failure of the data transfer path being used to transfer data to said application process on said subject and by automatically switching to another service instance supplying data on the requested subject in case of service instance failure so as to provide a substantially continuous flow of data on the requested subject to said at least one application process which is requesting data on said subject.

36. The apparatus of claim 35 further comprising means coupled to said server computers and to said at least one application process for providing server failure fault tolerance by automatically switching to another server computer upon which a data publishing process or service instance supplying data on the requested subject is in execution so as to maintain a substantially uninterrupted flow of data on the requested subject to said at least application process which requested data on said subject.

37. The apparatus of claim 18 or 32 or 33 or 34 wherein said subject based addressing program further comprises means for issuing a command to establish a subscription communication session with one or more of said data publishing processes capable of supplying data on the requested subject, and further comprising a service discipline means for encapsulating a protocol for communicating with one or more of said data publishing processes identified by said subject based addressing program as capable of supplying data on said subject, and for receiving said command to establish a subscription communication session with at least one or more of said data publishing processes, and for establishing a subscription communication session with said one or more data publishing processes, and for entering a subscription request to said data publishing process, and for receiving data on said subject and passing said data to said one or more application processes which requested data on said subject.

38. The apparatus of claim 18 further comprising at least two said networks, and means coupled to said at least one application process and said at least one data publishing process for providing network failure fault tolerance by automatically switching to an alternate network upon failure of the data transfer path being used.

39. The apparatus of claim 18 or 32 or 34 or 38 further comprising at least two server computers coupled to said network each of which has at least one said data publishing process in execution thereon capable of supplying data on the subject upon which data has been requested by said one or more application processes, and further comprising means coupled at least to said server computers and to said at least one application process for providing server failure fault tolerance by automatically switching to another server computer upon which a data publishing process supplying data on the requested subject is in execution so as to maintain a substantially uninterrupted flow of data on the requested subject to said at least one application process which requested data on said subject.

40. The apparatus of claim 18 further comprising communication means coupled at least to said subject based addressing program including at least one protocol engine for encapsulating a network communication protocol for establishing communications regarding said subject using the protocol native to said network.

41. The apparatus of claim 40 wherein said communication means is coupled to each of said application and data publishing processes, and wherein said application and data publishing processes communicate over said network through respective protocol engines using the same communication protocol, and wherein said protocol engines include means for cooperating to implement an intelligent multicast protocol wherein data regarding a particular subject is transmitted over the network using point-to-point communication protocol between the data publishing process and each application process having a current subscription to data on said subject until the number of subscribing application processes exceeds a number of subscriptions wherein point-to-point communications are the most efficient way to send the data, and then for switching automatically to a broadcast communication protocol.

42. The apparatus of claim 41 wherein said protocol engines switch automatically to a reliable broadcast communication protocol when a point-to-point communication protocol is no longer the most efficient way to transmit said data.

43. The apparatus of claim 41 wherein said protocol engines cooperate to implement an intelligent multicast protocol wherein any number of switches between said point-to-point and broadcast protocols may occur depending upon the number of application processes subscribing to said subject at any particular time, and wherein said point-to-point protocol includes reliable point-to-point protocol and said broadcast protocol includes reliable broadcast protocol.

44. The apparatus of claim 40 wherein said communication means is coupled to each of said application and data publishing processes, and wherein said application and data publishing processes communicate over said network through respective protocol engines using the same network communication protocol, and wherein said protocol engines cooperate to implement a reliable broadcast protocol wherein data on a subject is transmitted in discrete messages and wherein the complete reception of all discrete messages of a broadcast data transmission on a subject for which there is an outstanding subscription is verified by the protocol engines coupled to the application and data publishing processes, and any lost or garbled messages are rebroadcast.

45. The apparatus of claim 41 or 44 wherein said protocol engines filter data being transmitted over said network by subject.

46. The apparatus of claim 40 wherein said communication means includes a plurality of different protocol engines, each of which may encapsulate a different network communication protocol.

47. The apparatus of claim 40 wherein at least one said protocol engine supports subject based addressing by filtering incoming data by subject.

48. The apparatus of claim 18 wherein said subject based addressing program further comprises means for issuing a command to establish a subscription communication session with one or more of said data publishing processes capable of supplying data on the requested subject, and wherein said network further comprises transport layer protocol means for transferring data through said data transfer path according to a particular protocol native to said network, and further comprising a service discipline program means for encapsulating a communication protocol program capable of being invoked by said subject based addressing program via said command to establish a subscription communication session on the requested subject, and also for establishing a subscription communication session with one or more of said data publishing processes by invoking said transport layer protocol means and sending thereto data to be transmitted over said network on said subject, said service discipline program means also for sending an appropriate message to said one or more data publishing processes using the appropriate protocol for communicating with said data publishing processes to establish said subscription communication session for data on the requested subject, and also for receiving data on the requested subject and passing said data to said at least one application process which requested said data.

49. An apparatus for facilitating communication of data in an environment comprising one or more computers and a network coupling said one or more computers by one or more data transfer paths and having a transport layer protocol, and having at least one data publishing process in execution on at least one said computer so as to implement at least one service instance capable of outputting data for transmission over said network, and having at least one application process in execution on at least one of said computers for performing various operations including requesting data from one or more of said service instances, comprising:

service discipline means for receiving from at least one said application process a subscription request to obtain data from a specified service instance and for automatically carrying out processing to set up a communication link to said service instance over said network using appropriate communication protocols to communicate with said service instance so as to obtain said data whenever data is published by said service instance and for automatically providing said data to said application process which requested said data until said application process cancels said subscription request; and at least one protocol engine program in execution on at least one said computer and coupled to said service discipline means for interfacing said service discipline means to said transport layer protocol to set up said communication link over one or more of said data transfer paths.

50. The apparatus of claim 49 wherein said at least one data publishing process comprises a plurality of data publishing processes, and wherein said service discipline means is comprised of a plurality of service discipline means for carrying out the communication protocols needed to communicate with each different data publishing process, and wherein at least one of said service discipline means includes means for automatically establishing a communication session with the same data publishing process running on a different computer or a different but independent data publishing process supplying the same type data upon detection of failure to receive the requested data.

51. The apparatus of claim 50 further comprising one or more redundant networks or data paths coupling said one or more computers, and wherein said service discipline means includes means to re-establish any communication session to obtain the requested data by switching networks or switching computers to find an alternate data path to the selected data publishing process or an alternate computer upon which a data publishing process is running which can supply data of the same type as requested, and further comprising protocol engine means for implementing a reliable communication protocol to obtain the requested data such that missing or garbled packets are retransmitted.

52. The apparatus of claim 51 further comprising a communication means including a plurality of protocol engines for interfacing said service discipline means to said network, at least some of said protocol engines being coupled to said application and data publishing processes and including means for cooperating to implement a reliable broadcast communication protocol wherein the protocol engines coupled to a plurality of said application processes which are all receiving data from the same data publishing process via a broadcast communication protocol communicate with the protocol engine coupled to the data publishing process to insure that all packets of a message are successfully received by all subscribing application processes including cooperating to cause retransmission of missing or garbled packets, and wherein at least some of said protocol engines include means for cooperating to implement an intelligent multicast protocol wherein the protocol engines coupled to said data publishing process sends data to subscribing application processes via a point-to-point communication protocol until the number of subscribing processes reaches a number where it would be more efficient to send the data via a broadcast protocol, and then automatically switching to said reliable broadcast protocol when said number is reached, and for switching back and forth as needed between said point-to-point or reliable broadcast protocols depending upon the number of subscribing application processes at any particular time.

53. The apparatus of claim 52 wherein said service discipline means coupled to said data publishing process further comprises means for using said subscription list to determine the appropriate communication protocol to use in communicating said data over said network.

54. An apparatus as defined in claim 52, further comprising:
  means coupled to said application process, said data publishing process and said service discipline means for providing subject based addressing such that an application process may request data on a particular subject by entering a subscription request, and may receive said data continuously until the subscription is cancelled without the need to know the location of the data publishing process which can supply the requested data; and
  means coupled to said subject based addressing means for implementing subject entitlement checking such that access to data on certain subjects by certain application processes may be blocked; and
  further comprising means for providing fault recovery services so as to maintain the flow of requested data if possible.

55. The apparatus of claim 51 wherein said service discipline means includes means for automatic load balancing between computers running the selected data publishing process supplying the requested data such that communication sessions between requesting application processes and multiple computers and data publishing processes supplying the same data are substantially balanced across all operational computers upon which the selected data publishing process is running.

56. The apparatus of claim 49 further comprising a plurality of protocol engine means for implementing communication protocols for sending data over said network including means for implementing a point-to-point communication protocol and a reliable broadcast communication protocol, and for using said point-to-point communication protocol when the number of subscribing application processes to the same data is less than or equal to a programmable number, and for using said reliable broadcast communication protocol when the number of subscribing application processes to the same data is greater than said programmable number.

57. The apparatus of claim 49 wherein said service discipline protocol includes means to communicate over said network the fact that an application process has requested particular data by a subscription request, and further comprising a service discipline means coupled to a data publishing process which includes means for maintaining a list of active subscriptions, and for filtering outgoing data such that only subscribed to data is sent over the network so as to conserve network bandwidth.

58. The apparatus of claim 49 further comprising data format decoupling means, comprised of one or more computer programs coupled to each of said one or more application processes and said one or more data publishing processes, for facilitating the transfer of data via said network between said data publishing process and said application process using self-describing data objects by performing format conversion operations where the formats for the expression and organization of data records used by each computer, data publishing process and application process may be different, and wherein said self-describing data objects each contain one or more fields and are organized into one or more classes each of which has a unique class identification, and wherein the general organization of each class of self-describing data objects in terms of the names of each field and the format information defining either the class identification of the self-describing data object referenced in a field of another self-describing data object or the computer code used to express data contained in each field of the self-describing data object is defined in a class definition, and wherein the actual data to be transferred and said format information is stored in each instance of a self-describing data object, and wherein said data format decoupling means includes at least one forms manager program means for converting the data format of requested data from the data format in which said data is published by said data publishing process to a format suitable for transfer via said network and, upon receipt from said network, for converting said data from the format used for transfer over said network to a format used by said application process which requested the data, and for performing one or more of said format conversion operations using format information stored in the instance of the form itself.

59. An apparatus as defined in claim 49, further comprising:
  means coupled to said application process, said data publishing process and said service discipline means for providing subject based addressing such that an application process may request data on a particular subject by entering a subscription request, and may receive said data continuously until the subscription is cancelled without the need to know the location of the data publishing process which can supply the requested data; and
  means coupled to said subject based addressing means for implementing subject entitlement checking such that access to data on certain subjects by certain application processes may be blocked.

60. An apparatus for facilitating communications of data in a computing environment comprised of one or more computers and/or servers executing one or more data consuming software processes and one or more data publishing server processes coupled by one or more networks and/or other interprocess communication paths, comprising:

at least one service discipline means capable of communicating with said server processes;

first means for receiving a subscription request for data on a particular subject from a data consuming process and for mapping said subject to one or more said service discipline means which is capable of communicating with said data publishing server processes; and second means for invoking said service discipline means identified by said first means and using said service discipline means for establishing a communication session with said data publishing server process over said network or interprocess communication path between the requesting data consuming process and said data publishing server process, and for obtaining data only on the requested subject and passing said data to the data consuming process which requested the data.

61. The apparatus of claim 60 further comprising means for automatically translating data representations in one or more fields of data records containing data published by said data publishing server process from the format used by said data publishing server process to the format used by said data consuming process.

62. The apparatus of claim 61 further comprising means for performing data retrieval operations for data desired by said data consuming process stored in a specific data record from said data publishing server process, all said data records being grouped into one or more classes and each data record comprised of one or more fields, each class having all data records therein having the same organization in terms of names, sizes, sequences and data representation format for the fields comprising each said data record in the class, the foregoing characteristics for each class being defined in a class definition, said means for performing data retrieval operations including first means for receiving a request to obtain the data in a named field of a specified data record, and for accessing the class definition for the class to which said specified data record belongs and for searching the names of said fields listed in said class definition until the name specified in said request or a synonym thereof is found, and for generating a relative offset pointer address indicating the address of the desired field relative to the address of the start of the specified data record, said means for performing data retrieval operation further comprising second means coupled to said first means for using said relative offset pointer address to access said specified data record and the field therein specified by said relative offset pointer address and retrieve the data in the specified field upon request from said data consuming process.

63. An apparatus as defined in claim 60 wherein said first means includes means for storing a mapping table containing service records storing the identity or network address of one or more server process which supplies data on each particular subject and the appropriate one of said service discipline means to use in communicating with said server process, and further comprises means for consulting said mapping table in response to each said subscription request to match the subject of said subscription request to the subject of one or more service records in said mapping table and for returning to said first means the identity or address of one or more server processes which supply data on the requested subject and the identity of the appropriate service discipline means to communicate with the identified server process, and wherein said second means includes means coupled to said first means for receiving information from said first means from said mapping table including at least the identity and/or network address of a server process that supplies data on the requested subject and the identity of the appropriate service discipline means to use in communicating with the server process, if any, which publishes data on the subject identified in said subscription request and for invoking the identified service discipline means so as to establish a communication session with said data publishing server process using a communication protocol used by said server process and passing to said data publishing server process the subject identified in said subscription request, and for receiving data on said subject whenever said data publishing server process publishes data on said subject and passing said data to the data consuming process which made said subscription request until said subscription request is cancelled by said data consuming process.

64. The apparatus of claim 60 wherein said service discipline means includes means for filtering data by subject when said server process is broadcasting data on many subjects on said one or more networks and/or other interprocess communication paths, and for passing only data on the requested subject to the data consuming process which made the subscription request.

65. A communication interface for assisting in the exchange of data objects between software processes that use different data record formats and/or data representations for data objects, comprising:

means coupled to each said process for manipulating data objects called forms, each said form containing one or more class identifiers corresponding to one or more class definitions that give, for a corresponding class of forms, the name, data type and organization of the fields of each form of the class to which said form belongs, where each said field of a form may contain data or a form of another class, where each said form can store in each field thereof either actual data or a class identifier for another form such that multiple levels of nesting of forms can exist; and means for converting the format of a form to be transmitted to another process to a format necessary to accomplish the transmission over whatever data communication path exists between the two processes and for performing another conversion to data record format which renders said form suitable for use by the receiving process.

66. A communication interface for assisting in communication of data between computer processes which use different data record organizations and/or different data representations, comprising:

data record format conversion means coupled to each said process for manipulating self-describing data objects called forms each of which has one or more fields and which belongs to a class of forms having a unique class identifier, each field in a form capable of storing either actual data or the class identifier for another form, each form in any particular class having a data record organization, field names, and data format for each said field given by a class definition corresponding to the class identifier for that particular class, said data record format conversion means including means for translating the data record format for a form to be transmitted from one computer process to another first to a data record format suitable for transmission over whatever data communication path coupled the two processes together and then for translating the data record format of the transmitted form to a data record format suitable for use by the receiving software process; and semantic operation means coupled to said data format translation means and/or to each said process for receiving a request by a computer process to retrieve the data in any selected field of a particular form, said request identifying the particular form of interest and the name of the field of interest or a synonym thereof, and for accessing the class definition defining the field names and organization of the type of form identified in said request and locating a field having a name which matches the field name given in said request or is a synonym thereof and for returning a relative offset pointer address locating said field in every instance of said form and for accessing the form identified in said request and using said relative offset pointer address to locate the data in the field of interest and obtain and return said data to the request process.

67. A process for communicating data between software processes coupled by a data communication path comprising:

receiving a request for information on a particular subject from a requesting software process and automatically mapping that subject using a subject mapper program to the identity of a service discipline program which is capable of communicating with a data publishing process that supplies data on that subject; and invoking said service discipline program identified by said subject mapper program and establishing a communication link over the network or other communication path used by said data publishing process to publish data using said service discipline program and filtering data published by said data publishing process by subject if necessary such that only data on the requested subject reaches said requesting software process.

68. A process for communicating data between one or more processes running on one or more computers comprising the steps of:

receiving a request for information on a particular subject from a data consuming process and automatically mapping that subject to a data publishing process called a service that supplies data on that subject and to a service discipline encapsulating an appropriate communication procedure in order to communicate with the service identified by the mapping step, and outputting service record data identifying said service and said service discipline;

invoking the service discipline identified by said service record data and establishing a communication link with said service using said service discipline such that data on the requested subject reaches said subscriber process which requested said data;

exchanging the requested data between said service and said requesting computer program using self-describing data objects such that communications with said service are done using data objects having the format used by said service while the data received by said requesting computer program is via data objects having the format used by said data consuming process; and monitoring the reliability of the exchange of data and retransmitting lost data or switching services supplying data on the subject if necessary so as to maintain the flow of reliable data.

* * * * *

REEXAMINATION CERTIFICATE (2870th)
United States Patent [19]

Skeen et al.

[11] B1 5,187,787

[45] Certificate Issued May 7, 1996

[54] APPARATUS AND METHOD FOR PROVIDING DECOUPLING OF DATA EXCHANGE DETAILS FOR PROVIDING HIGH PERFORMANCE COMMUNICATION BETWEEN SOFTWARE PROCESSES

[75] Inventors: Marion D. Skeen, San Francisco; Mark Bowles, Woodside, both of Calif.

[73] Assignee: Teknekron Software Systems, Inc., Palo Alto, Calif.

Reexamination Requests:
No. 90/003,271, Dec. 9, 1993
No. 90/003,320, Jan. 21, 1994
No. 90/003,790, Apr. 11, 1995

Reexamination Certificate for:
Patent No.: 5,187,787
Issued: Feb. 16, 1993
Appl. No.: 386,584
Filed: Jul. 27, 1989

[51] Int. Cl.[6] .................. G06F 15/16; G06F 15/173; G06F 17/30
[52] U.S. Cl. .................. 395/600; 364/DIG. 1; 364/281.3; 364/240.8; 364/246.3; 395/200.09
[58] Field of Search .................. 395/200.03, 200.09, 395/200.13, 200.15, 600, 650

[56] References Cited

U.S. PATENT DOCUMENTS

| | | |
|---|---|---|
| 4,823,122 | 4/1989 | Mann et al. . |
| 4,975,904 | 12/1990 | Mann et al. . |
| 4,975,905 | 12/1990 | Mann et al. . |
| 5,058,108 | 10/1991 | Mann et al. . |

OTHER PUBLICATIONS

IBM Disclosure Bulletin vol. 28 #5, pp. 2160–2161 'Revisable Form Document Conversion', Oct. 1985.

*Primary Examiner*—Thomas M. Heckler

[57] ABSTRACT

A communication interface for decoupling one software application from another software application such communications between applications are facilitated and applications may be developed in modularized fashion. The communication interface is comprised of two libraries of programs. One libray manages self-describing forms which contain actual data to be exchanged as well as type information regarding data format and class definition that contain semantic information. Another library manages communications and includes a subject mapper to receive subscription requests regarding a particular subject and map them to particular communication disciplines and to particular services supplying this information. A number of communication disciplines also cooperate with the subject mapper or directly with client applications to manage communications with various other applications using the communication protocols used by those other applications.

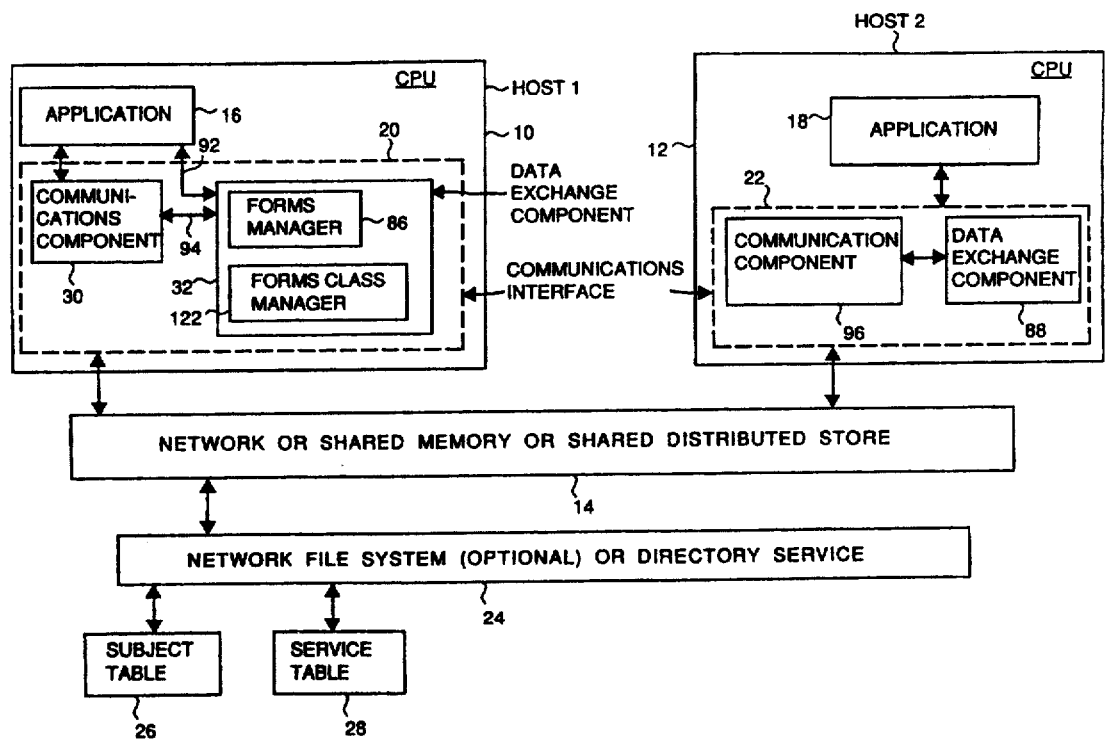

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–48, 60–66, 68 is confirmed.

Claims 49, 67 are determined to be patentable as amended.

Claims 50–59, dependent on an amended claim, are determined to be patentable.

New claims 69–87 are added and determined to be patentable.

49. An apparatus for facilitating communication of data in an environment comprising one or more computers and a network coupling said one or more computers by one or more data transfer paths and having a transport layer protocol, and having at least one data publishing process in execution on at least one said computer so as to implement at least one service instance capable of outputting data for transmission over said network, [and having] *said apparatus comprising:*
- at least one application process, in execution on at least one of said computers, for performing various operations including requesting data [from] *by subject;*
- *mapping means for mapping said subject to an address of one or more said service instances*[, comprising:] *to specify at least one service instance;* service discipline means for receiving from at least one said application process a subscription request to obtain data from [a] *at least one specified* service instance and for automatically carrying out processing to set up a communication link to said service instance over said network using appropriate communication protocols to communicate with said service instance so as to obtain said data whenever data is published by said service instance and for automatically providing said data to said application process which requested said data until said application process cancels said subscription request; and
- at least one protocol engine program in execution on at least one said computer and coupled to said service discipline means for interfacing said service discipline means to said transport layer protocol to set up said communication link over one or more of said data transfer paths.

67. A process for communicating data between software processes coupled by a network or other data communicating path comprising:
- receiving a request for information on a particular subject from a requesting software process and automatically mapping that subject using a subject mapper program to the identity of a service discipline program which is capable of communicating with a data publishing process that supplies data on that subject; and,
- invoking said service discipline program identified by said subject mapper program and establishing a communication link over the network or other communication path used by said data publishing process to publish data using said service discipline program and filtering data published by said data publishing process by subject if necessary such that only data on the requested subject reaches said requesting software process.

69. The apparatus of claim 1 in which said first and second software layers are configured to establish point to point communication between said data consuming and data publishing processes.

70. The apparatus of claim 69 in which said first software layer is coupled to a directory services component to supply an identification of said data publishing process providing information on said subject to said first software layer.

71. The apparatus of claim 3 in which said service discipline programs are configured to establish point to point communication between the one or more of said service processes, which provides data on said subject, and the appropriate application process that originated the subscription process.

72. The apparatus of claim 71 in which said one or more subject based addressing programs is coupled to a directory services component to supply an identification of the one or more of said services processes which provides data on said subject.

73. The apparatus of claim 15 in which said one or more service discipline programs and said subject based addressing program are configured to establish point to point communication between said one or more data consuming application processes and said one or more service processes.

74. The apparatus of claim 73 in which said subject based addressing program is coupled to a directory services component to supply an identification of said one or more service processes supplying data on the particular subject to said subject based addressing program.

75. The apparatus of claim 16 in which said library of communications programs is configured to establish point to point communication between said publisher processes and said subscriber processes.

76. The apparatus of claim 75 in which said library of communications programs is coupled to a directory services component to supply an identification of said at least one of said publisher processes supplying data on said subject.

77. The apparatus of claim 18 in which said subject based addressing program is configured to establish point to point communication between said at least one application process and said at least one data publishing process.

78. The apparatus of claim 77 in which said subject based addressing is coupled to a directory service component to provide an identification of said at least one data publishing process to said subject based addresssing program.

79. The apparatus of claim 49 in which said service discipline means is configured to establish point to point communication between said at least one data publishing process and said at least one application process.

80. The apparatus of claim 79 in which said mapping means is coupled to a directory service component to provide an identification of said at least one data publishing process to said mapping means.

81. The apparatus of claim 60 in which said second means for invoking said service discipline means is configured to establish point to point communication between said one or more data publishing service processes and said one or more consuming software processes.

82. The apparatus of claim 81 in which said first means for receiving a subscription request on a particular subject and for mapping said subject is coupled to a directory service component to provide an identification of said one or more data publishing server processes to said first means for receiving a subscription request on a particular subject and for mapping said subject.

83. The process of claim 67 in which the communication link is point to point between said data publishing process and said requesting software process.

84. The process of claim 83 in which said subject mapper program is coupled to a directory service component to provide an identification of said data publishing process to said subject mapper program.

85. The process for communicating data according to claim 67, wherein the subject mapper program maps the subject to a publisher process that publishes data on that subject and to the service discipline program.

86. The process of claim 68 in which the communication link is point to point between said data publishing process and said data consuming process.

87. The process of claim 86 in which the particular subject is mapped by obtaining an identification of the data publishing process from a directory service component.

* * * * *